United States Patent [19]
Toyofuku et al.

[11] Patent Number: 5,301,193
[45] Date of Patent: Apr. 5, 1994

[54] DELAY DISTORTION SUPPRESSING SYSTEM FOR ATM COMMUNICATION SYSTEM

[75] Inventors: Hidetoshi Toyofuku, Kawasaki; Masanori Kajiwara, Tokyo; Takeshi Tanaka; Hideki Mase, both of Kawasaki; Atsuyuki Mukai, Fukuoka; Tomonobu Takashima, Kawasaki, all of Japan

[73] Assignee: Fujitsu Limited, Kanagawa, Japan

[21] Appl. No.: 791,524

[22] Filed: Nov. 14, 1991

[30] Foreign Application Priority Data

Nov. 14, 1990 [JP] Japan .................. 2-306211
Jan. 31, 1991 [JP] Japan .................. 3-031997

[51] Int. Cl.5 ............................... H04L 12/56
[52] U.S. Cl. ......................... 370/94.1; 370/99; 370/108
[58] Field of Search ............... 370/13, 44, 94.1, 100.1, 370/108, 60, 85.6, 94.3, 99; 375/12, 14, 101, 118

[56] References Cited

U.S. PATENT DOCUMENTS

| | | | |
|---|---|---|---|
| 4,175,214 | 11/1979 | Wedmore | 370/44 |
| 4,817,085 | 3/1989 | De Prycker | 370/108 |
| 5,115,431 | 5/1992 | Williams et al. | 370/94.1 |

FOREIGN PATENT DOCUMENTS

| | | |
|---|---|---|
| 2439 | 1/1988 | Japan . |
| 63346 | 3/1990 | Japan . |
| 141144 | 5/1990 | Japan . |
| 203641 | 8/1990 | Japan . |

*Primary Examiner*—Benedict V. Safourek
*Attorney, Agent, or Firm*—Staas & Halsey

[57] ABSTRACT

A delay distortion suppressing system is for use in an asynchronous transfer mode communication system which includes at least a transmitting end and a receiving end which are connected via transmission paths. The delay distortion suppressing system includes a first part provided in the transmitting end for transmitting information in the form of cells in an asynchronous transfer mode, a second part provided in the receiving end for delaying each cell which is received via a transmission path by a predetermined delay time relative to a reference point, a third part provided in the receiving end for varying the reference point depending on an arrival time of the cell which is received at the receiving end via the transmission path, so that a delay distortion of the cells is suppressed, and a fourth part including a decoding part for decoding the cells output from the second part.

35 Claims, 21 Drawing Sheets

$y = I_{max} - I$

DELAY DISTORTION SUPPRESSING SYSTEM FOR ATM COMMUNICATION SYSTEM

BACKGROUND OF THE INVENTION

The present invention generally relates to delay distortion suppressing systems, and more particularly to a delay distortion suppressing system for use in an asynchronous transfer mode (ATM) communication system.

In the ATM communication system, each of various kinds of information such as audio signals, image signals and data is divided into cells which have a constant length, and the cells are multiplexed via a buffer and transmitted. When the number of transmitted cells increases, the cells remain in the buffer for a longer time. On the other hand, the cells remain in the buffer for a shorter time when the number of transmitted cells decreases. Accordingly, a delay distortion is introduced in the cells which are multiplexed and transmitted. At the receiving end, a receiving buffer made up of a first-in-first-out (FIFO) buffer is provided in order to suppress or absorb the delay distortion. It is desirable that the receiving end have a large delay distortion suppressing range and that the absolute delay time is small.

FIG. 1 shows an essential part of an example of a conventional ATM communication system. A transmitting end includes a coding part 41, a cell forming part 42, a signal detecting part 43 and a multiplexing part 45 which has a buffer 44. On the other hand, a receiving end includes a demultiplexing part 46, a receiving buffer 47, a cell disassembling part 48 and a decoding part 49. The transmitting end and the receiving end are coupled via a transmission line 50, an ATM exchange and the like which are not shown.

At the transmitting end, the signal detecting part 43 detects whether an input signal is an audio signal or a modem signal. The signal detecting part 43 controls the coding part 41 and the cell forming part 42 depending on the detected result, so that the input signal is subjected to an appropriate coding process in the coding part 41 and subjected to an appropriate cell forming process in the cell forming part 42. Each cell which is output from the cell forming part 42 has a length of 53 bytes which is made up of a 5-byte header and a 48-byte information field. The cells output from the cell forming part 42 are multiplexed via the buffer 44 of the multiplexing part 45 and transmitted to the transmission line 50.

Generally, with respect to the audio signal, the cell forming part 42 judges whether or not each cell is a voiced cell which includes voice or an unvoiced cell which includes no voice, and the cell forming part 42 supplies only the voiced cells to the multiplexing part 45. When transmitting the cells, the multiplexing part 45 can add a cell number, a cell transmission time and the like to the header.

At the receiving end, the demultiplexing part 46 demultiplexes the multiplexed cells received from the transmission line 50. The demultiplexed cells are supplied to the cell disassembling part 48 via the receiving buffer 47, and each cell is disassembled into the header and the information field. The information field is supplied to the decoding part 49. The cell disassembling part 48 also judges whether or not each cell is related to an audio signal or a modem signal, and controls the decoding part 49 depending on the result of the judgement. Hence, the decoding part 49 carries out a decoding process in correspondence with the kind of information, that is, the audio signal or the modem signal.

As the number of cells input to the multiplexing part 45 from several channels increases, the waiting time of the cells in the buffer 44 becomes longer. On the other hand, when the number of cells input to the multiplexing part 45 decreases, the waiting time of the cells in the buffer 44 becomes shorter. As a result, the delay time of the cells which are multiplexed in the multiplexing part 45 and transmitted to the transmission line 50 changes, and a delay distortion of the cells occurs. When such a delay distortion occurs for the audio signal cells, the quality of the reproduced audio signal at the receiving end deteriorates. Accordingly, the receiving buffer 47 is provided on the receiving end so as to suppress the delay distortion.

The receiving buffer 47 is made up of a FIFO memory having a memory capacity which is, for example, twice the delay distortion suppressing range. The cell which arrives first is written at the center of the FIFO memory and is read out by successively shifting the cell within the FIFO memory. If the second cell arrives at the time a reference delay time elapses, this second cell likewise is written at the center of the FIFO memory. If the second cell arrives after the reference delay time elapses, this next cell is written on the output side from the center of the FIFO memory. On the other hand, if the next cell arrives before the reference delay time elapses, this next cell is written on the input side from the center of the FIFO memory. As a result, the delay distortion is suppressed when the cells are output from the FIFO memory, that is, the receiving buffer 47.

However, in order to suppress the delay distortion, the FIFO memory requires a memory capacity which is twice the delay distortion suppressing range. However, when the delay distortion suppressing range is set large, the cells remain in the FIFO memory for a relatively long time and there is a problem in that the absolute delay time becomes large.

On the other hand, there is active research in broadband integrated services digital networks (B-ISDNs) which enables communication of broad-band information such as images. The ATM is suitable for use in this broad-band ISDN. In this case, the cells are multiplexed at each node within the network, but generally, the cells are delayed if congestion occurs on the line. A difference inevitably occurs among the delay times of the cells, thereby causing a delay distortion.

FIG. 2 shows an essential part of an example of a conventional ISDN employing the ATM. In FIG. 2, those parts which are basically the same as those corresponding parts in FIG. 1 are designated by the same reference numerals, and a description thereof will be omitted. In this example, a terminal 510 is telephone set, but various other kinds of terminals may be used as the terminal 510. The multiplexed cells are transmitted to the transmission line (not shown) via a switch $520_1$ of an ATM switch 520, and this ATM switch 520 carries out a switching operation so that the multiplexed cells are transmitted to an ATM switch (not shown) which is connected to a destination terminal (not shown) via the transmission line. On the other hand, the multiplexed cells which are received from the transmission line are supplied to the demultiplexer part 46 via a switch $520_2$ of the ATM switch 520.

After the cells are generated in the cell forming part 42, the cells are delayed when congestion occurs in the path, which path includes the multiplexing part 45, the ATM switch 520 and the transmission line, and particularly in the multiplexing part 45, which includes the buffer, and in the ATM switch 520. In this case, the cells in most cases arrive at the receiving end with different delays, and such different delays are often referred to as the delay distortion. The voice cannot be reproduced correctly if the delay distortion occurs, and there is a problem in that the contents of the communication cannot be understood by the listener when the delay distortion occurs.

SUMMARY OF THE INVENTION

Accordingly, it is a general object of the present invention to provide a novel and useful delay distortion suppressing system in which the problems described above are eliminated.

Another and more specific object of the present invention is to provide a delay distortion suppressing system for an asynchronous transfer mode communication system which includes at least a transmitting end and a receiving end which are connected via transmission paths, comprising first means, provided in the transmitting end, for transmitting information over a transmission path in the form of cells in an asynchronous transfer mode, second means, provided in the receiving end, for delaying each cell, as received from the transmission path by a predetermined delay time relative to a reference point, third means, provided in the receiving end and coupled to the second means, for varying the reference point depending on an cell reception time of the received cell which is received at the receiving end from the transmission path, so that a delay distortion of the cell is suppressed, and fourth means, coupled to the second means, including decoding means for decoding the cells output from the second means. According to the delay distortion suppressing system of the present invention, it is possible effectively to suppress the delay distortion. Therefore, it is possible to prevent discontinuity of voice in the case where the information is a continuous audio information.

Still another object of the present invention is to provide the delay distortion suppressing system of the type described above where each cell is comprises a header and an information field, the first means includes means for inserting a cell transmitting time in the header of each cell, the second means includes storage means for storing each cell received from the transmission path, inserting means for inserting a cell reception time in the header of each cell received from the transmission path, and control means for controlling write and read operations of the storage means based on the cell transmission time and the cell reception time included in the header of each cell which is read out from the storage means, a delay distortion suppressing range and the predetermined time so that the cell which arrives first is written into the storage means and read out after a time which corresponds to the delay distortion suppressing range, and the third means varies the reference point upon determining that a difference between the cell transmission time and the cell reception time is smaller than the predetermined time. According to the delay distortion suppressing system of the present invention, it is possible to suppress the delay distortion effectively by suitably and automatically adjusting the reference point. Therefore, it is possible to prevent discontinuity of voice in the case where the information is continuous audio information.

A further object of the present invention is to provide the delay distortion suppressing system of the type described above, wherein the first means includes priority cell generating means for generating a priority cell from a head of the information, the priority cell being transmitted over a transmission path which causes a minimum delay while other cells following the priority cell are transmitted over other transmission paths having normal delays, the third means includes means for setting a reception time of the priority cell as the reference point and means for statistically obtaining a maximum delay time of the cells following the priority cell, and the second means delays each cell by the predetermined time which is set independently for each cell so that a total delay time of each cell becomes the maximum delay time. According to the delay distortion suppressing system of the present invention, it is possible to suppress the delay distortion effectively by using the priority cell. Therefore, it is possible to prevent discontinuity of voice in the case where the information is continuous audio information.

Other objects and further features of the present invention will be apparent from the following detailed description when read in conjunction with the accompanying drawings.

DESCRIPTION OF THE PREFERRED EMBODIMENTS

First, a description will be given of a first embodiment of a delay distortion suppressing system according to the present invention, by referring to FIG. 4. In this embodiment, the absolute delay time is reduced by writing the received cell into a FIFO memory and immediately reading out the cell for decoding.

Figure 1:
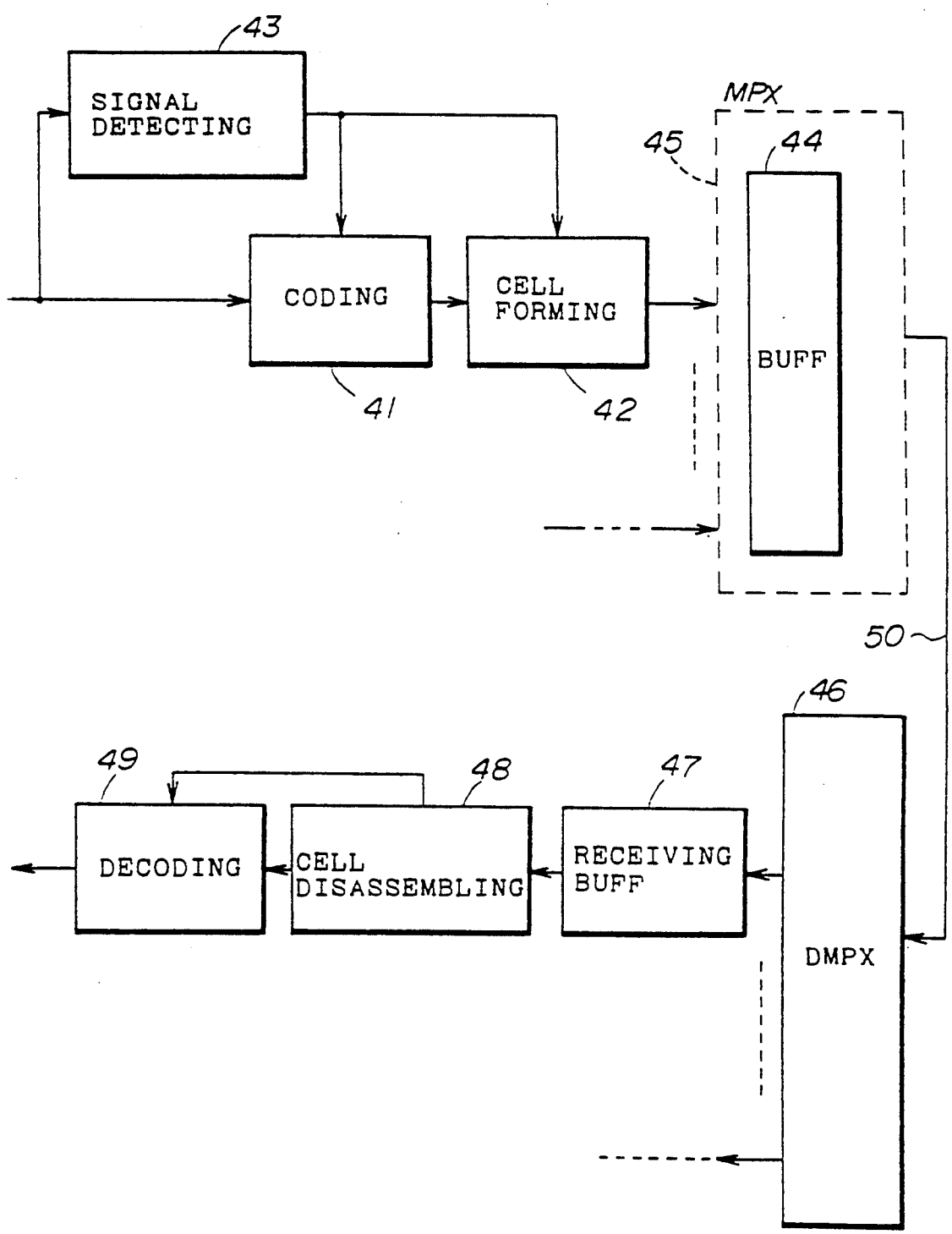
FIG. 1 is a system block diagram showing an essential part of an example of a conventional ATM communication system.
Figure 2:
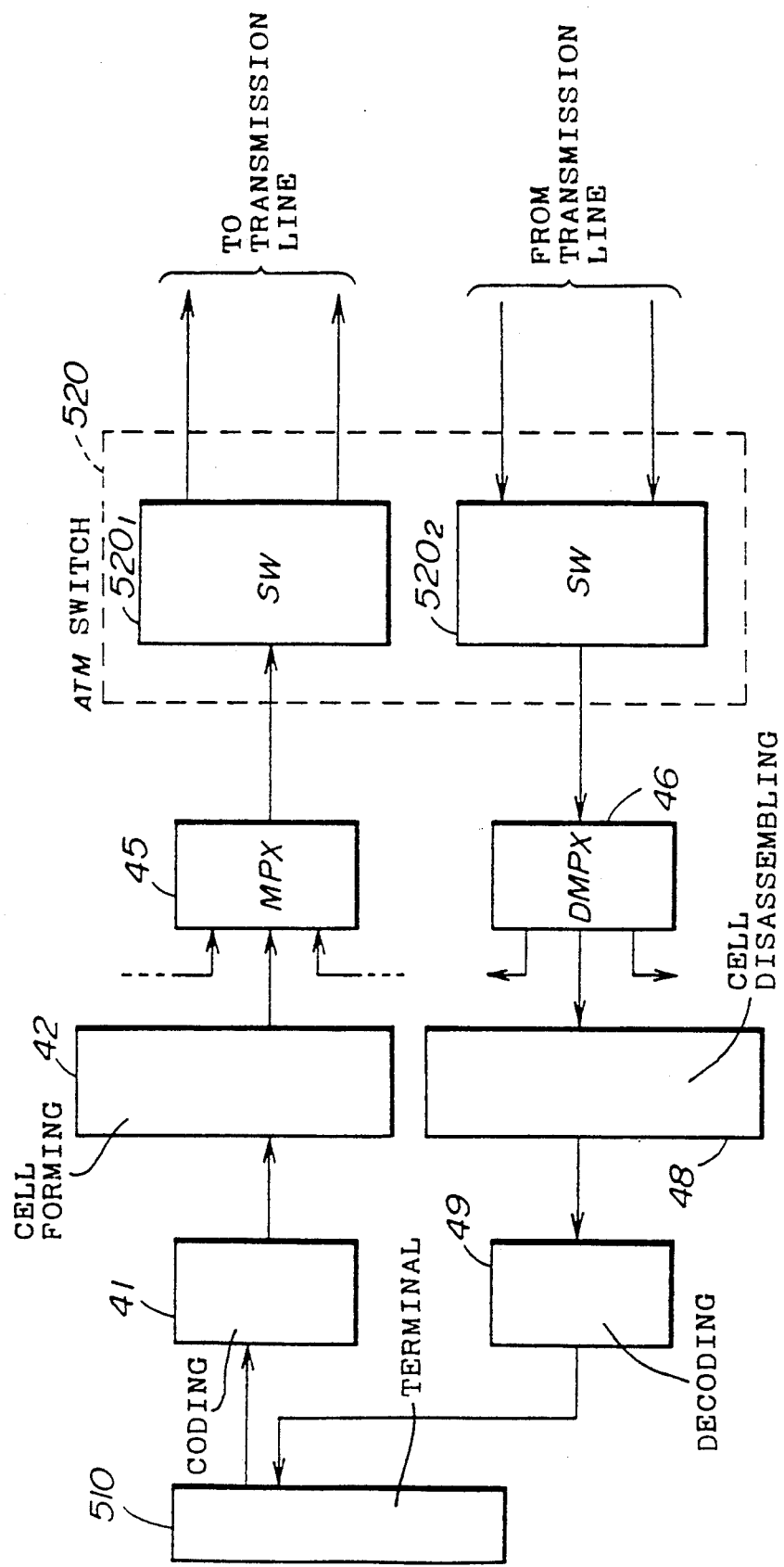
FIG. 2 is a system block diagram showing an essential part of an example of a conventional ISDN employing the ATM.
Figure 3:
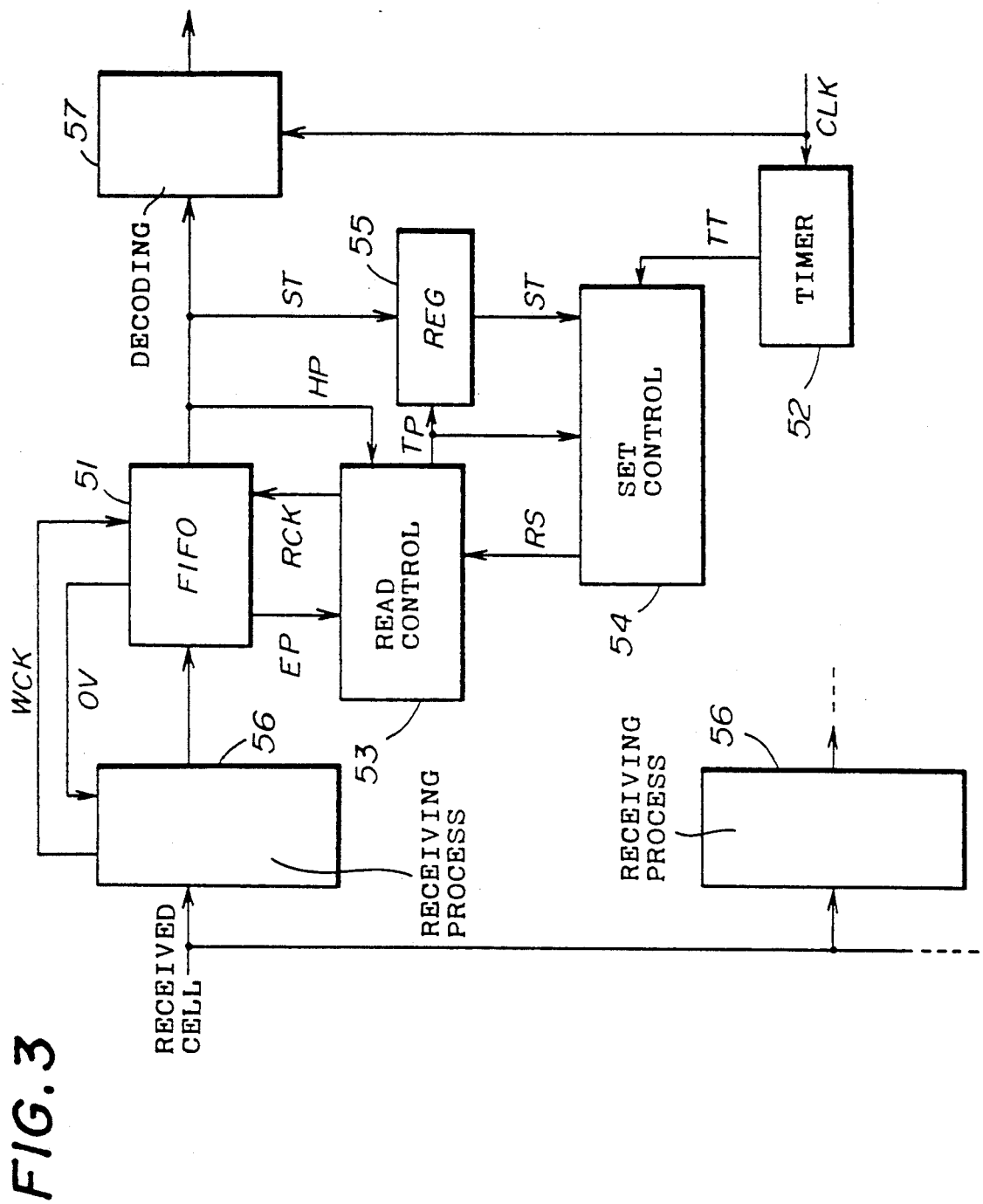
FIG. 3 is a system block diagram showing an essential part of a first embodiment of a delay distortion suppressing system according to the present invention.

The system shown in FIG. 3 includes a FIFO memory 51, a timer 52, a read control part 53, a set control part 54, a register 55, a receiving process part 56 and a decoding part 57. All parts except a decoding part in FIG. 3 realize the function of the cell disassembling part 48 shown in FIGS. 1 and 2.

The receiving process part 56 detects the header of the received cell, and detects the virtual path identifier VPI and the virtual channel identifier VCI of the header. The receiving process part 56 supplies to the FIFO memory 51 only the received cells intended for this channel. The receiving process part 56 supplies a write clock signal WCK to the FIFO memory 51 upon determining that no overflow flag OV is received from the FIFO memory 51, so as to write the received cells into the FIFO memory 51. Hence, each receiving process part 56 has the function of demultiplexing the received cells intended for its own channel.

The read control part 53 supplies to the FIFO memory 51 a read clock signal RCK for reading out the received cells upon determining that no empty flag EP is received from the FIFO memory 51, that is, upon determining that the received cells are written into the FIFO memory 51. The read control part 53 outputs a timing pulse TP based on a cell header pulse HP of the received cell which is read out from the FIFO memory 51 in response to the read clock signal RCK. This timing pulse TP is used to set in the register 55 a cell transmission time ST which is added to the header of the received cell. The cell transmission time ST which is set in the register 55 is supplied to the set control part 54.

The information field of the received cell which is read out from the FIFO memory 51 is supplied to the decoding part 57 wherein a decoding process is carried out based on a decoding clock signal CLK. The timer 52 counts pulses of the decoding clock signal CLK, and a counted value TT is supplied to the set control part 54, and the set control part 54 compares the cell transmission time ST and the counted value TT. The set control part 54 supplies a control signal RS to the read control part 53 so that a difference between the cell transmission time ST and the counted value TT becomes constant. The set control part 54 carries out other control operations such as controlling the timing of the read clock signal RCK which is supplied to the FIFO memory 51.

Figure 4:
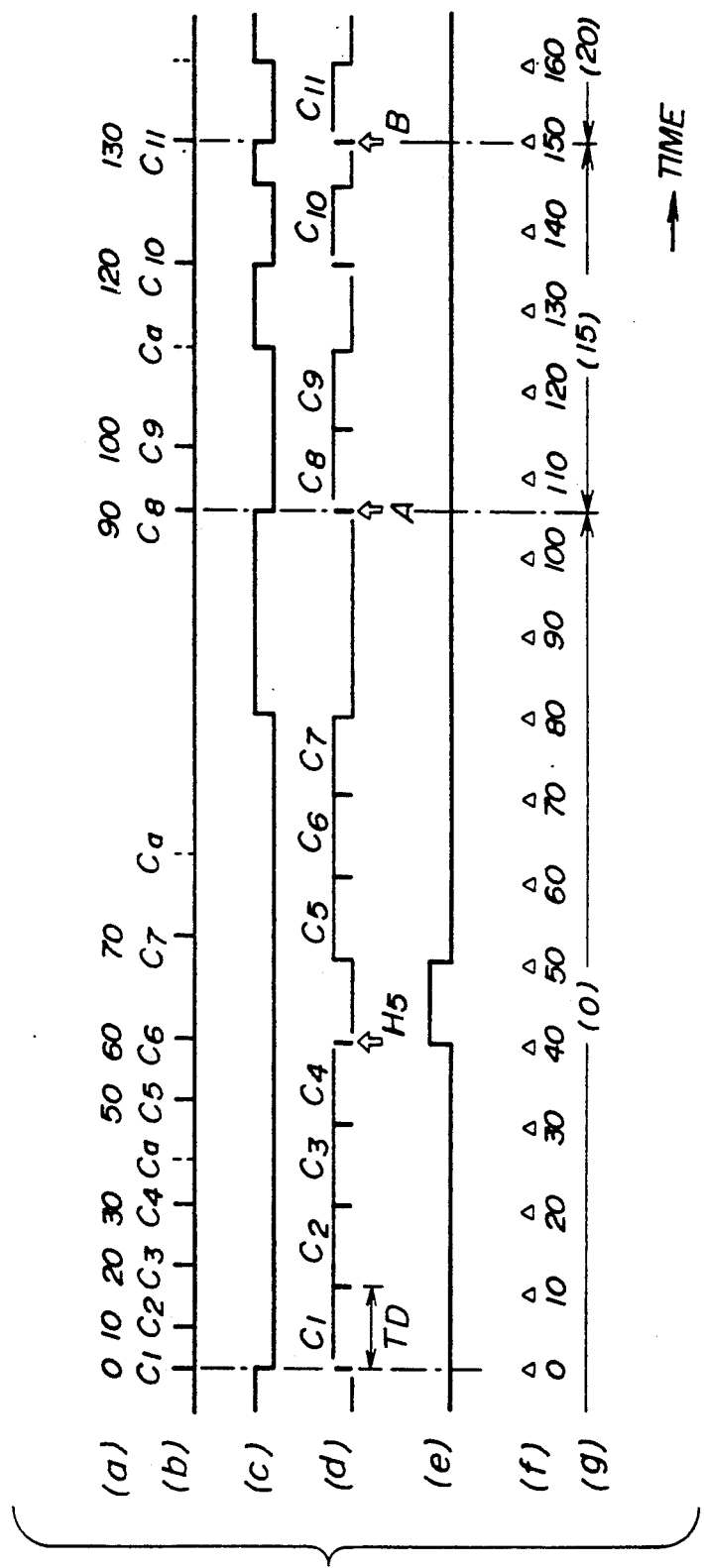
FIG. 4 is a timing chart for explaining the operation of the first embodiment.

FIG. 4 is a timing chart for explaining the operation of the first embodiment shown in FIG. 3. In FIG. 4, (a) shows the cell transmission time ST which is added to the header of the received cell, and (b) shows the timing of cells C1 through C11 which are written into the FIFO memory 51, where Ca shows a case where the cell is an unvoiced cell and is therefore not transmitted. In addition, in FIG. 4, (c) shows an empty flag EP, and (d) shows the headers of the cells read out from the FIFO memory 51 by bold lines and the decoding times of the cells C1 through C11, where TD denotes the decoding time of one cell. Furthermore, in FIG. 4, (e) shows the read waiting time, (f) shows the counted value TT of the timer 52, and (g) shows the difference between the cell receiving time and the cell transmission time ST.

The cells C1 through C11 having the cell transmission times ST=0 to 130 arrive at intervals different from the intervals of the cell transmission times ST. When the cell C1 having the cell transmission time ST=0 in (a) is written into the FIFO memory 51 with the timing shown in (b), the empty flag EP changes from "1" to "0" as shown in (c). In addition, the counted value TT of the timer 52 which counts the pulses of the decoding clock signal CLK increases with a constant period as shown in (f). Moreover, when the empty flag EP is "0", the header of the cell is read out the FIFO memory 51 at a constant period as shown in (d), and the cell transmission time ST is set in the register 55. This transmission time which is set in the register 55 and the counted value TT of the timer 52 are compared in the set control part 54, and the read clock signal RCK output from the read control part 53 is controlled so that the difference between the cell transmission time ST and the counted value TT becomes constant.

During the decoding time TD of the first cell C1, the cell C2 having the cell transmission time ST=10 is written into the FIFO memory 51, and this cell C2 is read out from the FIFO memory 51 and decoded when the counted value TT of the timer 52 is "10". Similarly, the cell C3 having the cell transmission time ST=20 and the cell C4 having the cell transmission time ST=30 are respectively read out from the FIFO memory 51 and decoded when the counted value TT of the timer 52 is "20" and "30".

Since the next cell Ca is an unvoiced cell and is not transmitted, the cell C5 having the next cell transmission time ST=50 is written into the FIFO memory 51, and a header H5 of the cell C5 is read out as shown in (d) of FIG. 4 when the counted value TT of the timer 52 is "40". The cell transmission time ST added to this header H5 is "50", and thus, TT<ST. During the read waiting time shown in (e) of FIG. 4 until the relationship TT=ST is obtained, no read clock signal RCK is supplied to the FIFO memory 51 and the supply of the information field of the cell C5 to the decoding part 57 is waited.

The information field of the cell C5 is supplied from the FIFO memory 51 to the decoding part 57 and decoded when the counted value TT of the timer 52 becomes "50". The cells C6 and C7 are decoded similarly. In this case, the difference between the cell transmission time ST and the counted value TT of the timer 52 becomes "0" as shown in (g) of FIG. 4.

The cell Ca next to the cell C7 is an unvoiced cell. When the delay time of the next cell C8 is large, the FIFO memory 51 becomes empty upon completion of the decoding of the cell C7 ends, and the empty flag EP becomes "1". In this case, the reproduced audio output is interrupted because the coding is interrupted for a time longer than the interval of the unvoiced cell Ca.

When the cell C8 having the cell transmission time ST=90 arrives at a point A, this cell C8 is written into the FIFO memory 51 and the empty flag EP becomes "0". The header of this cell C8 is read out from the FIFO memory 51 and the cell transmission time ST=90 is set in the register 55. The set control part 54 compares the cell transmission time ST in the register 55 and the counted value TT of the timer 52, and in this case, a reference point of the minimum delay time is changed because $(ST-TT)<0$. In addition, the information field of the cell C8 is supplied from the FIFO memory 51 to the decoding part 57 and decoded. The cells C9 and C10 which arrive after the cell C8 are read out from the FIFO memory 51 so that the difference between the counted value TT of the timer 52 and the cell transmission time ST becomes "15" and constant.

When the cell C11 having the cell transmission time ST=130 arrives at a point B when the counted value TT of the timer 52 is "150", the reference point of the minimum delay time is changed because $(ST-TT)<-15$. In addition, the information read out from the FIFO memory 51 is controlled so that the difference between the counted value TT of the timer 52 and the cell transmission time ST thereafter becomes "20".

According to the first embodiment, the cell is read out immediately from the FIFO 51 and decoded in correspondence with the cell transmission time ST thereof when the cell is written into the FIFO memory 51. For this reason, the absolute delay time can be made small by making the time in which the cell remains in the FIFO memory 51 short.

However, the distribution of the cells which arrive from the minimum delay time to the time which is the delay distortion suppressing range after, is such that the number of cells arriving in the vicinity of the minimum delay time is large while the number of cells arriving thereafter rapidly decreases. But that depends on an application, so it is unclear whether or not the arrival of the first cell is in the vicinity of the reference point of the minimum delay time, and it is necessary to change the reference point for the delay distortion suppression as indicated by the point A or B in FIG. 4 until the following cells fall within the delay distortion suppressing range. Consequently, the coding process is interrupted during a time when the counted value TT of the timer 52 is "80" to "150", for example, and there is a problem in that the quality of the sound deteriorates because a time discontinuity occurs in the reproduced audio output.

Accordingly, a description will be given of a second embodiment of the delay distortion suppressing system according to the present invention, in which the problem of the first embodiment is eliminated.

First, a description will be given of the operating principle of the second embodiment, by referring to FIG. 5. In this embodiment, a FIFO memory is used to suppress the delay distortion of the received cells as in the first embodiment.

Figure 5:
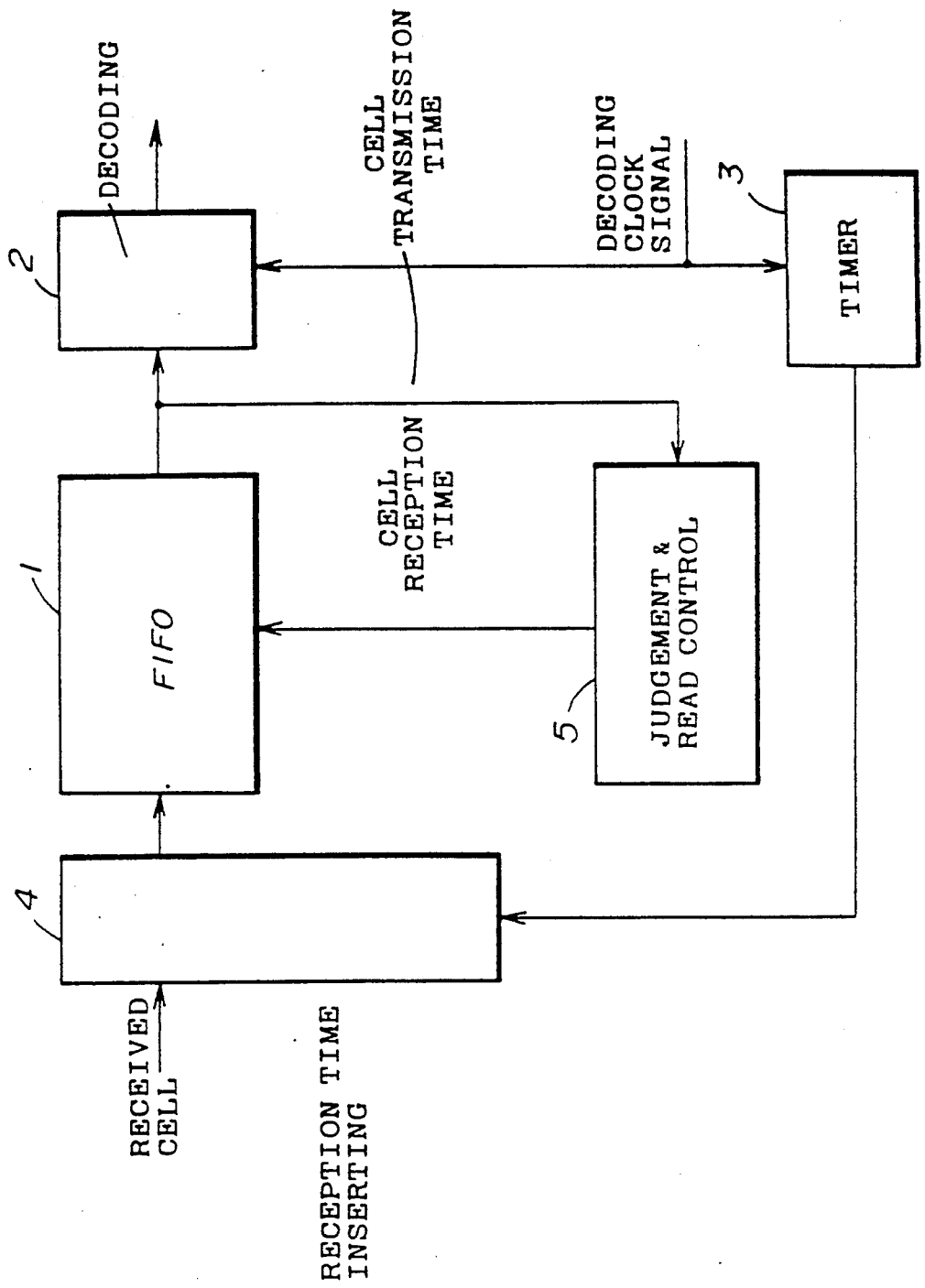
FIG. 5 is a system block diagram for explaining the operating principle of a second embodiment of the delay distortion suppressing system according to the present invention.

In the ATM communication system shown in FIG. 5, only the information field of the received cell which is read out from a FIFO memory 1 is supplied to a decoding part 2. A timer 3 counts pulses of a decoding clock signal which is supplied to the decoding part 2. These two contents are the same as in the first embodiment. A reception time inserting part 4 inserts the content of the timer 3 into the header of the received cell as a cell reception time and supplies it to the FIFO memory 1. A judgement and read control part 5 controls the read operation of the FIFO 1 based on the minimum delay time, the delay distortion suppressing range, the cell reception time and the cell transmission time added to the header of the received cell which is read out from the FIFO memory 1. After writing into the FIFO memory 1 the received cell which arrives first, the judgement and read control part 5 then reads this received cell from the FIFO memory 1 after a time corresponding to the delay distortion suppressing range. Thereafter, the judgement and read control part 5 changes the reference point of the minimum delay time when it is judged that the difference between the cell transmission time and the cell reception time is smaller than the minimum delay time. Thus, since the decoding is first started by a delay time corresponding to the delay distortion suppressing range, the reproduced audio output will not be interrupted too long when the reference point of the minimum delay time is thereafter shifted a little depending on the size of the delay distortion.

In addition, the judgement and read control part 5 reads out the header of the received cell from the FIFO memory 1 every time the decoding process of the decoding part 2 ends, and judges whether or not the difference between the cell reception time and the cell transmission time added to the header is smaller than the minimum delay time. If the difference between the cell reception time and the cell transmission time is smaller than the minimum delay time, the judgement and read control part 5 changes the reference point of the minimum delay time and reads the information field of this reception cell according to this reference. The read information field is supplied to the decoding part 2.

Figure 6:
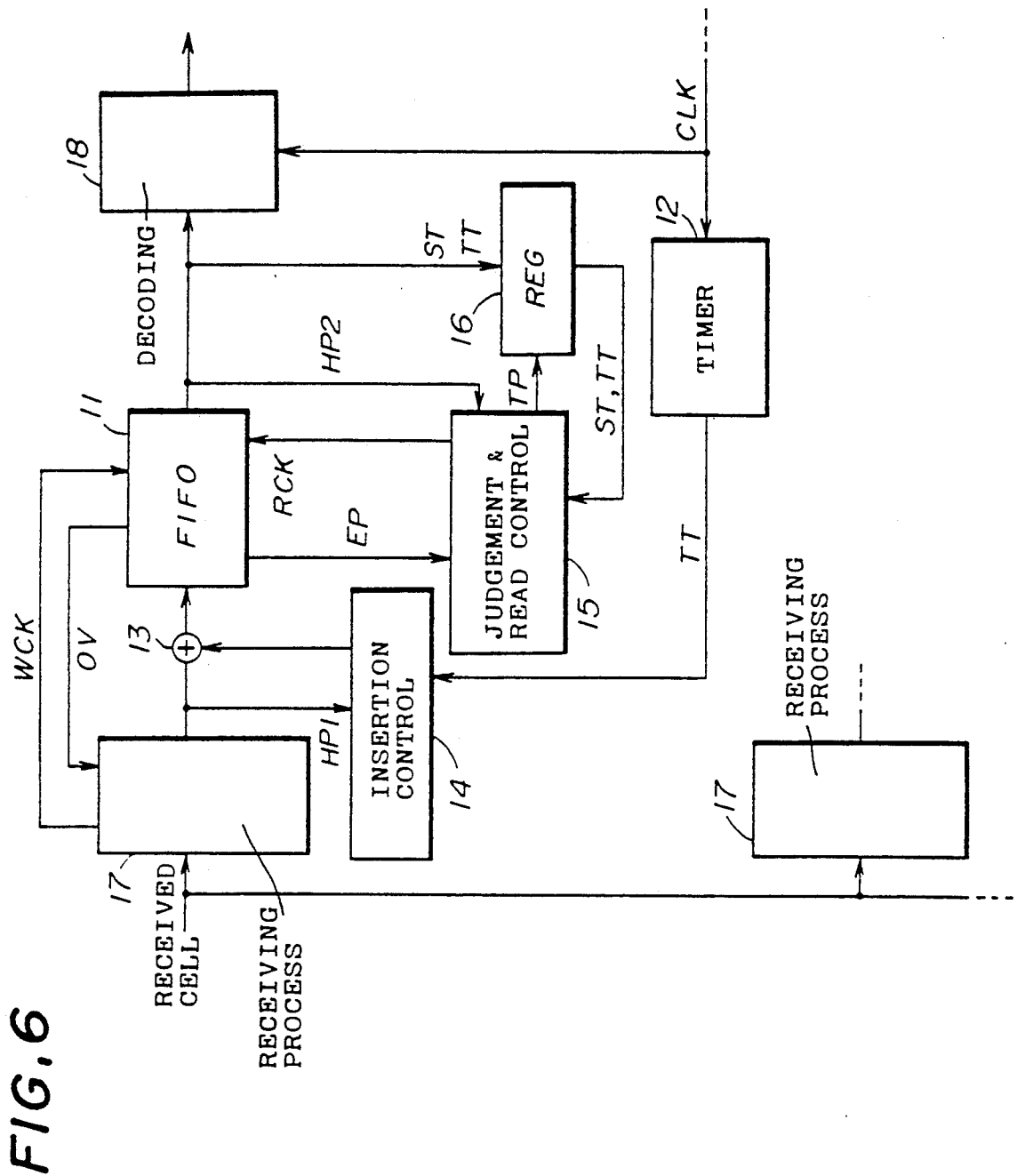
FIG. 6 is a system block diagram showing the second embodiment.
Figure 7:
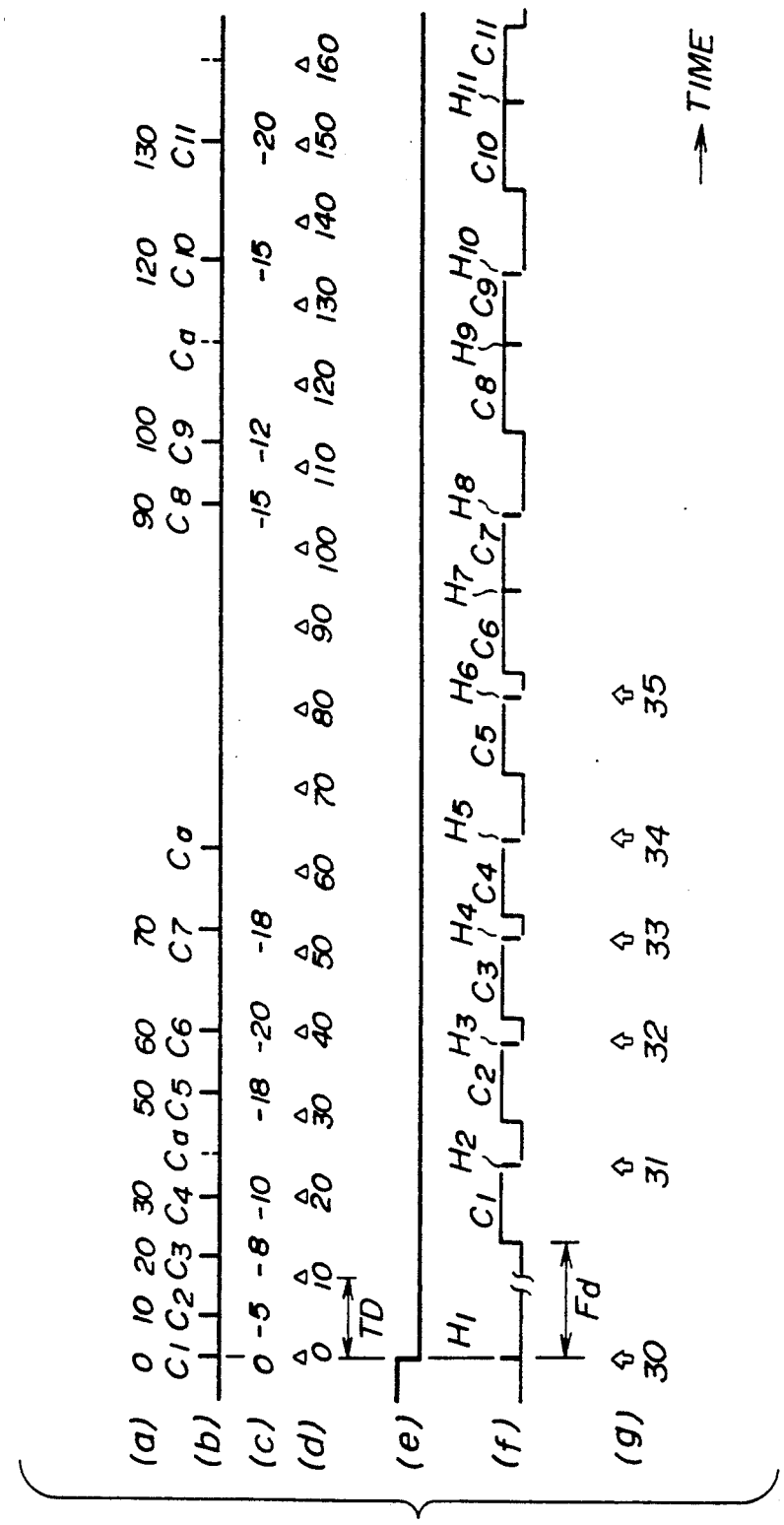
FIG. 7 is a timing chart for explaining the operation of the second embodiment.

Next, a more detailed description will be given of the second embodiment, by referring to FIGS. 6 and 7. FIG. 6 shows an essential part of the second embodiment, and FIG. 7 is a timing chart for explaining the operation of the second embodiment.

The system shown in FIG. 6 includes a FIFO memory 11, a timer 12, an inserting circuit 13, an insertion control part 14, a judgement and read control part 15, a register 16, a receiving process part 17 and a decoding part 18.

When the received cell arrives at the receiving process part 17, the receiving process part 17 judges the virtual path identifier VPI and the virtual channel identifier VCI in the header of the received cell. The receiving process part 17 supplies only the received cell of its own channel to the FIFO memory 11 via the inserting circuit 13. The receiving process part 17 also supplies a write clock signal WCK to the FIFO memory 11 when no overflow flag OV is received from the FIFO memory 11. The received cell is written into the FIFO memory 11 in response to the write clock signal WCK.

The timer 12 counts pulses of a decoding clock signal CLK which is supplied to the decoding part 18, and supplies a counted value TT to the insertion control part 14. The insertion control part 14 controls the inserting circuit 13 so as to insert the counted value TT at a predetermined position of the header of the received cell based on a cell header pulse HP1. The inserting circuit 13 inserts the counted value TT as a cell reception time. Accordingly, the header of the received cell includes the cell transmission time, which is added at the transmitting end, and the cell reception time, which is inserted in the inserting circuit 13. Then the header is written into the FIFO memory 11.

A delay distortion suppressing range is set in the judgement and read control part 15. This delay distortion suppressing range can be switched depending on whether the cells is an audio signal cell or a modem signal cell. The judgement and read control part 15 judges whether or not this part supplies a read clock signal RCK to the FIFO memory 11 upon determining that no empty flag EP is received from the FIFO memory 11. This empty flag EP indicates that the FIFO memory 11 is empty. The judgement and read control part 15 also outputs a timing signal TP, which is used to set in the register 16 the cell transmission time ST and the cell reception time TT which had been added in the header of the received cell read out from the FIFO memory 11. This timing signal TP is transmitted in response to a cell header pulse HP2 of the received cell, which is read out from the FIFO memory 11. With respect to the received cell which arrived first, the judgement and read control part 15 reads the cell transmission time ST and the cell reception time TT, which are set in the register 16, and supplies the read clock signal RCK to the FIFO memory 11 after the time corresponding to the set delay distortion suppressing range elapses. Hence, the information field of this first received cell is read out from the FIFO memory 11 and is supplied to the decoding part 18. Thereafter, the judgement and read control part 15 judges whether or not the reference point of the minimum delay time should be changed depending on whether or not the difference between the cell transmission time ST and the cell reception time TT is smaller than the minimum delay time, and controls the supply of the read clock signal RCK to the FIFO memory 11.

FIG. 7 is a timing chart for explaining the operation of the second embodiment shown in FIG. 6. In FIG. 7, (a) shows the cell transmission time ST which is added to the header of the received cell, and (b) shows the timing of cells C1 through C11 which are written into the FIFO memory 11, where Ca shows that the cell is an unvoiced cell and is therefore not transmitted. In addition, in FIG. 7, (c) shows the difference between the cell receiving time TT and the cell transmission time ST, and (d) shows the counted value TT of the timer 12, that is, the cell reception time TT, where TD denotes the decoding time of one cell. In FIG. 7, (e) shows an empty flag EP, and (f) shows the decoding times of the received cells C1 through C11, where the bold lines indicate the headers H1 through H11 of the received cells C1 through C11, which are read out from the FIFO memory 51, and Fd indicates the delay distortion suppressing range. Furthermore, in FIG. 7, the time base of (f) matches the time bases of (a) through (e) only initially and the time base in (f) thereafter is shifted by the amount which is shortened by the delay distortion suppressing range Fd. Furthermore, in FIG. 7, (g) shows an initial state 30 of the reference point of the minimum delay time and changed points 31 through 35.

When the first received cell C1 having the cell transmission time ST=0 arrives, the receiving process part 17 supplies the write clock signal WCK to the FIFO memory 11 because no overflow flag OV is received from the FIFO memory 11. If the counted value of the timer 12 in this state is the cell reception time TT=0, the inserting circuit 13 inserts this cell reception time TT=0 into the predetermined position of the header under the control of the insertion control part 14 depending on the cell header pulse HP1, which is received from the receiving process part 17. The received cell C1 which is inserted with the cell reception time TT=0, is then written into the FIFO memory 11.

Since the empty flag UP from the FIFO memory 11 changes from "1" to "0" as shown in (e) of FIG. 7, the judgement and read control part 15 supplies the read clock signal RCK to the FIFO memory 11 to read out the header H1 of the received cell C1. In addition, the judgement and read control part 15 supplies the timing pulse TP to the register 16 in response to the cell header pulse HP2, which is received from the FIFO memory 11, so as to set the cell transmission time ST=0 and the cell reception time TT=0 in the register 16. Because the received cell C1 is the first cell, the judgement and read control part 15 supplies the read clock signal RCK to the FIFO memory 11 after the delay distortion suppressing range Fd, so as to read out the information field of the received cell C1 as shown in (f) of FIG. 7 and to supply the information field to the decoding part 18 to be decoded into the audio signal. During this time, the received cells C2, C3, C4 and C5 respectively having the cell transmission times ST=10, 20, 30 and 50 arrive when the counted value TT of the timer 12 is 5, 12, 20 and 32 respectively there are cells successively written into the FIFO memory 11 as shown in (b) of FIG. 7.

The header H2 of the next received cell C2 is read out from the FIFO memory 11 after the decoding time of the received cell C1. As in the case of the received cell C1 described above, the cell transmission time ST=10 and the cell reception time TT=5 of the received cell C2 are set in the register 16. The judgement and read control part 15 obtains D2=TT−ST=−5 and compares D2 with D1=TT−ST=0 for the previous received cell C1. In this case, D1>D2, and thus, the judgement and read control part 15 changes the reference point of the minimum delay time. The information field of the received cell C2 is read out from the FIFO memory 11 to be decoded in the decoding part 18, after a time corresponding to D1-D2. Similarly, the header H3 of the next received cell C3 is read out from the FIFO memory 11 after the decoding time of the received cell C2. The cell transmission time ST=20 and the cell reception time TT=12 of this received cell C3 are set in the register 16. The judgement and read control part 15 obtains D3=TT−ST=−8. In this case, D2>D3, and thus, the judgement and read control part 15 changes the reference point of the minimum delay time. The information field of the received cell C3 is read out from the FIFO memory 11 to be decoded after a time corresponding to D2-D3.

The next received cell C4 has the cell transmission time ST=30 and the cell reception time TT=20. Hence, D4=TT−ST=−10, and D3>D4. For this reason, the reference point of the minimum delay time is changed, and the information field of the received cell C4 is read out from the FIFO memory 11 to be decoded after a time corresponding to D3-D4.

An unvoiced cell Ca exists after the received cell C4, and the received cell C5 exists after this unvoiced cell Ca. The received cell C5 has the cell transmission time ST=50 and the cell reception time TT=32. Hence, D5=TT−ST=−18, and D4>D5. Accordingly, the reference point of the minimum delay time is changed, and the information field of the received cell C5 is read out from the FIFO memory 11 to be decoded after a time corresponding to D4-D5. For the next received cell C6, D6 = −20 and D5 > D6, and the reference point of the minimum delay time is also changed in this case. For the next received cell C7, D7 = −18 and D6 < D7. In this case, the information field of the received cell C7 is read out from the FIFO memory 11 without changing the reference point of the minimum delay time. Therefore, the reference point of the minimum delay time is changed at the changed points 31 through 35 in (g) of FIG. 7.

D8 = −15 and D6 < D8 for the received cell C8. Hence, the reference point of the minimum delay time is not changed, but it can be detected from the cell transmission time ST that an unvoiced cell Ca exists next to the received cell C7. Thus, the information field of the received cell C8 is read out from the FIFO memory 11 to be decoded after a time TD corresponding to one cell decoding.

The judgement and read control part 15 thereafter judges whether or not this point changes the reference point of the minimum delay time, similarly as described above, and controls the read out from the FIFO memory 11. In this way, the reference point of the minimum delay time is adjusted smoothly. As a result, it is possible to prevent discontinuity in the reproduced sound, and the delay distortion is suppressed satisfactorily.

Figure 8:
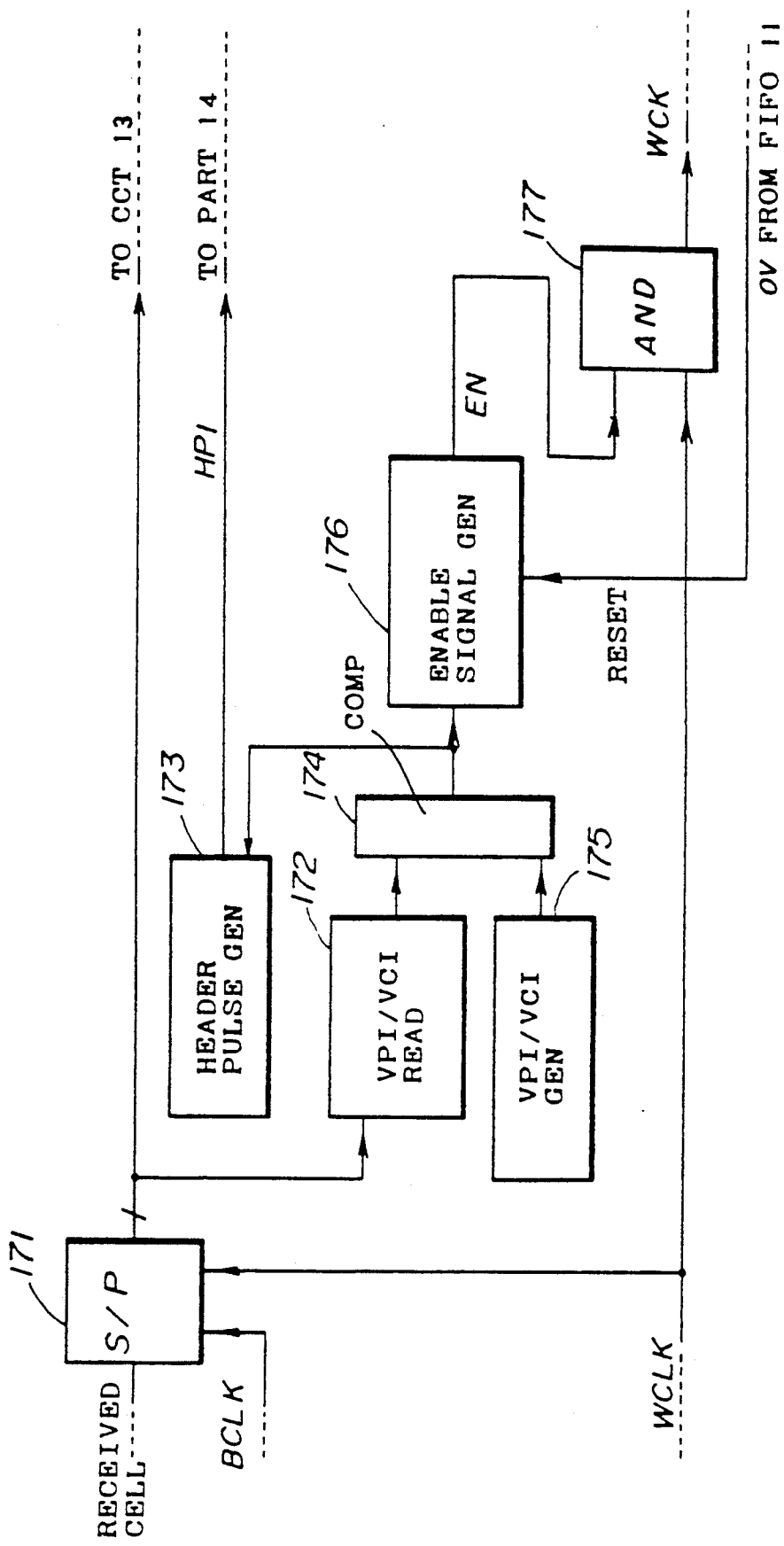
FIG. 8 is a system block diagram showing an embodiment of a receiving process part shown in FIG. 6.
Figure 9:
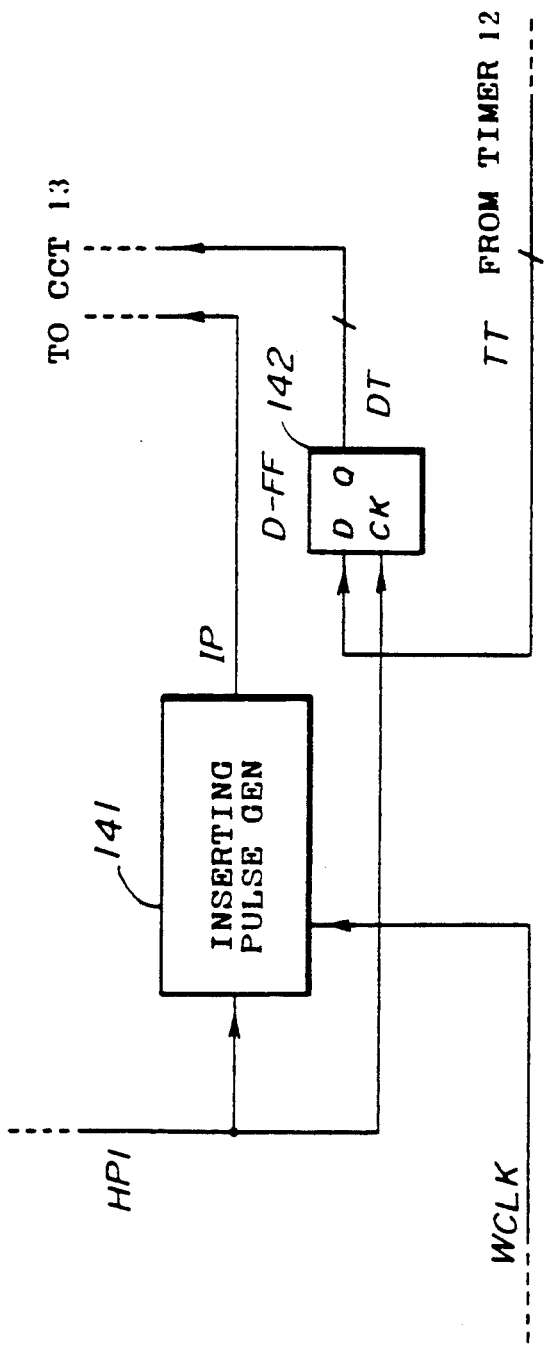
FIG. 9 is a system block diagram showing an embodiment of an insertion control part shown in FIG. 6.

FIG. 8 shows an embodiment of the receiving process part 17 shown in FIG. 6, and FIG. 9 shows an embodiment of the insertion control part 14 shown in FIG. 6.

In FIG. 8, the receiving process part 17 includes a serial-to-parallel (S/P) converter 171, a VPI/VCI reading part 172, a cell header pulse generator 173, a comparator 174, a VPI/VCI generator 175, an enable signal generator 176 and an AND circuit 177, which are connected as shown.

Figure 10:
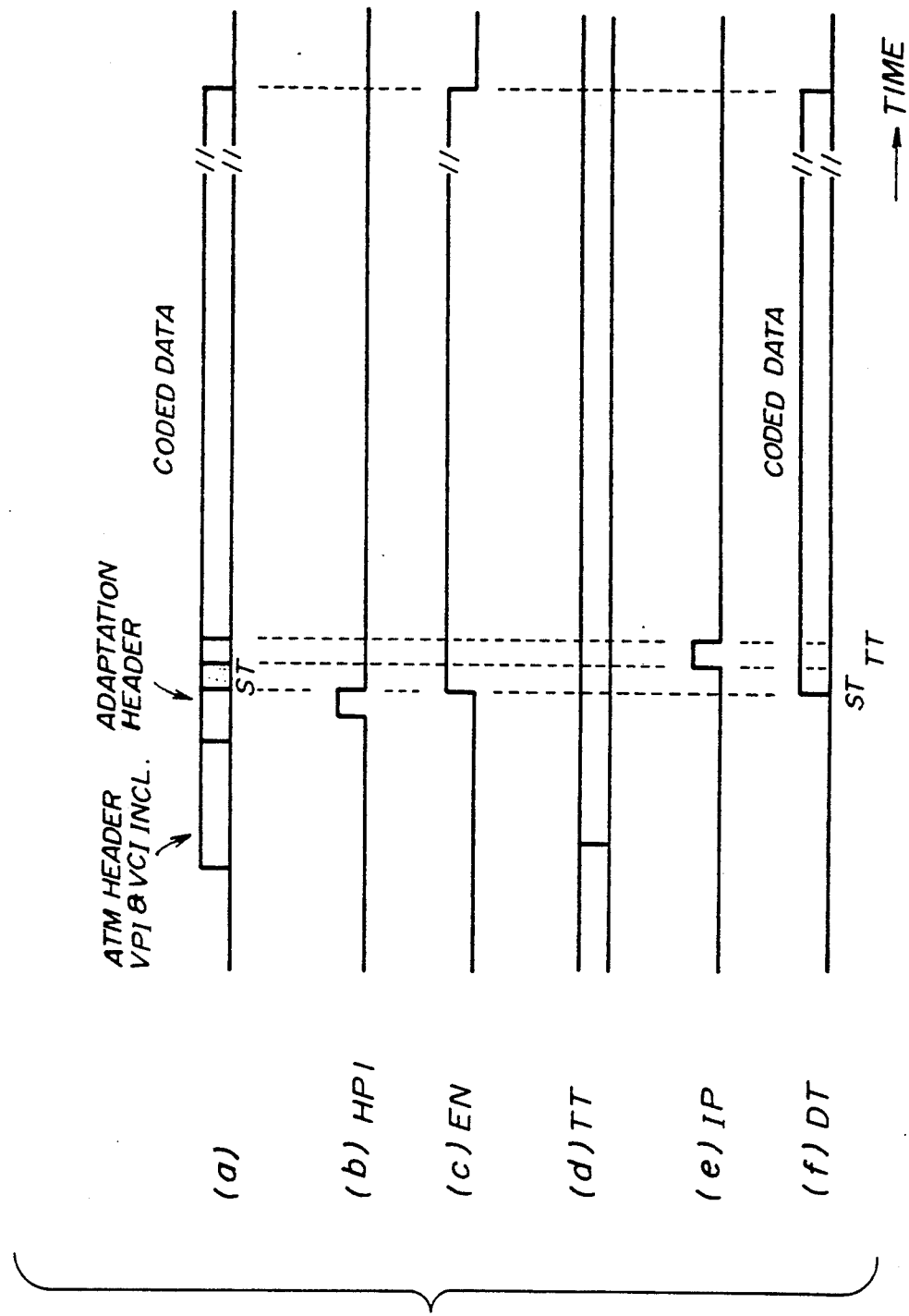
FIG. 10 is a timing chart for explaining the operations of the receiving process part and the insertion control part shown in FIGS. 8 and 9.

The S/P converter 171 converts the received cell shown in (a) of FIG. 10 into parallel data based on a bit clock signal BCLK and a word clock signal WCLK of the received cell data. The VPI/VCI reading part 172 reads the VPI and VCI from the header of the parallel data output from the S/P converter 171. The parallel data from the S/P converter 171 is also supplied to the inserting circuit 13 shown in FIG. 6. On the other hand, the cell header pulse generator 173 generates the cell header pulse HP1 shown in (b) of FIG. 10 based on outputs of a comparator 174. The cell header pulse HP1 is supplied to the insertion control part 14.

The VPI and VCI which are read in the VPI/VCI reading part 172 are supplied to the comparator 174 which also receives the VPI and VCI of its own channel generated from the VPI/VCI generator 175. If the VPIs and the VCIs compared in the comparator 174 match, it is detected that the received cell is intended for this channel. In this case, the enable signal generator 176 generates an enable signal EN amounting to one cell based on the output of the comparator 174. This enable signal EN shown in (c) of FIG. 10 is supplied to the AND circuit 177, which also receives the word clock signal WCLK, and an output signal of the AND circuit 177 is supplied to the FIFO memory 11 shown in FIG. 6 as the write clock signal WCK. The enable signal generator 176 is reset responsive to the overflow signal OV from the FIFO memory 11.

In FIG. 9, the insertion control part 14 includes an insertion pulse generator 141 and a delay flip-flop 142, which are connected as shown. The cell header pulse HP1 from the receiving process part 17 is supplied to the insertion pulse generator 141 and to a clock terminal CK of the flip-flop 142. The insertion pulse generator 141 generates an insertion pulse IP shown in (e) of FIG. 10 based on the cell header pulse HP1 and the word clock signal WCLK. This insertion pulse IP is supplied to the inserting circuit 13. On the other hand, the counted value TT (parallel data) from the timer 12 shown in FIG. 6 is supplied to a data terminal D of the flip-flop, and a data DT is output from an output terminal Q of the flip-flop 142. The counted value TT (parallel data) is shown in (d) of FIG. 10, and the data TT is shown in (f) of FIG. 10. The data TT from the flip-flop 142 is supplied to the inserting circuit 13, and the data DT in (f) of FIG. 10 is supplied to the FIFO 11 in FIG. 6.

Figure 11:
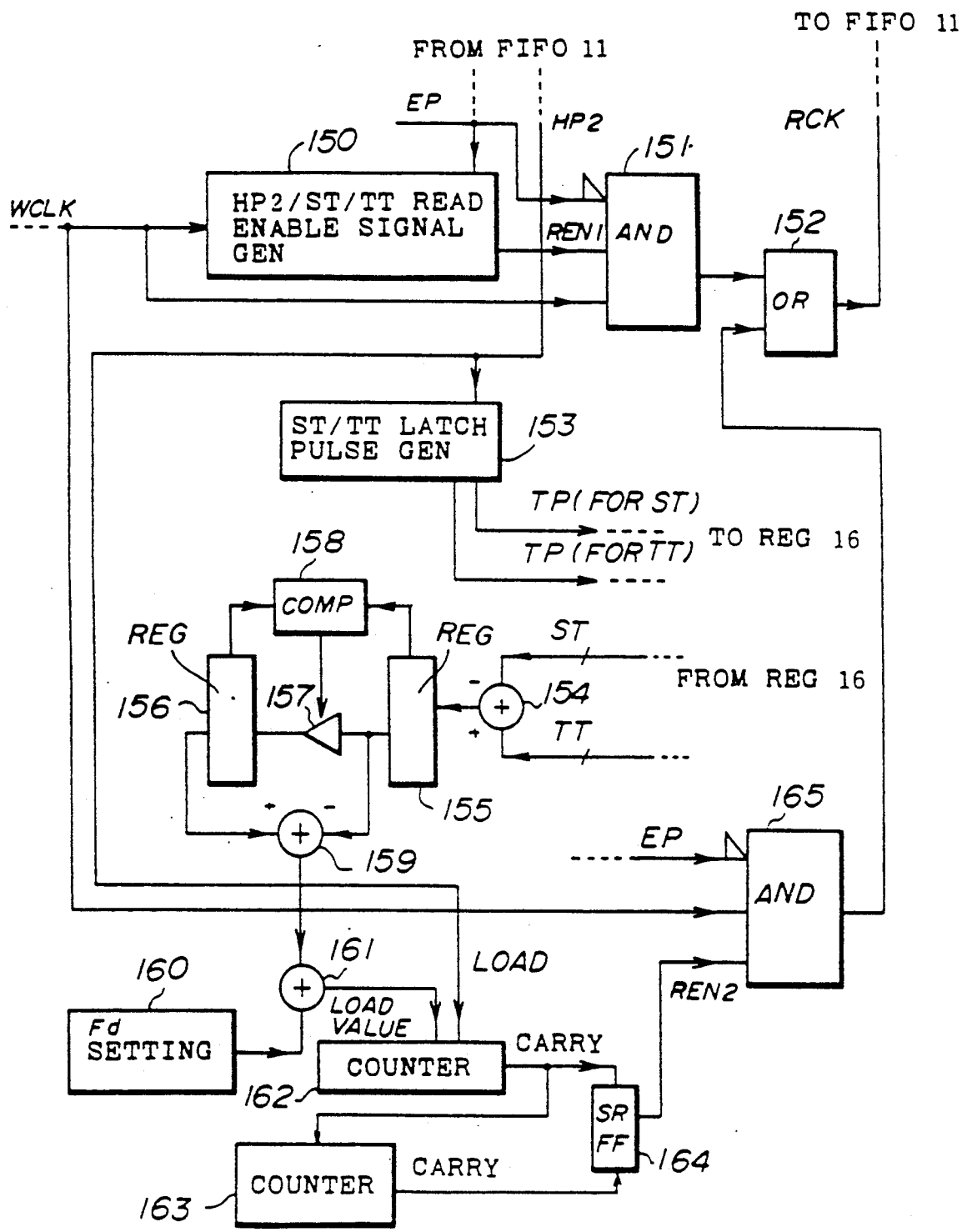
FIG. 11 is a system block diagram showing an embodiment of a judgement and read control part shown in FIG. 6.

FIG. 11 shows an embodiment of the judgement and read control part 15 shown in FIG. 6. The judgement and read control part 15 shown in FIG. 11 includes a HP2/ST/TT read enable signal generator 150, an AND circuit 151, an OR circuit 152, a ST/TT latch pulse generator 153, subtracting circuits 154 and 159, registers 155 and 156, a buffer 157, a comparator 158, a delay distortion suppressing range setting circuit 160, an adding circuit 161, counters 162 and 163, a set-reset flip-flop 164 and an AND circuit 165 which are connected as shown.

The word clock signal WCLK of the cell data which is output from the FIFO 11 shown in FIG. 6 is supplied to the HP2/ST/TT read enable signal generator 150 and the AND circuits 151 and 165. The HP2/ST/TT read enable signal generator 150 also receives the empty flag EP from the FIFO memory 11, and supplies to the AND circuit 151 a read enable signal REN1 for enabling reading of the cell header pulse HP2, the cell transmission time ST and the cell reception time TT. The empty flag EP is also supplied to the AND circuit 151. An output signal of the AND circuit 151 is supplied to an OR circuit 152, which outputs the read clock signal RCK, which is supplied to the FIFO memory 11. The OR circuit 152 also receives an output signal of the AND circuit 165, which will be described later.

The ST/TT latch pulse generator 153 receives the cell header pulse HP2 from the FIFO memory 11, and generates a ST/TT latch pulse (timing signal) TP. The timing signal TP for setting the cell transmission time ST and the timing signal TP for setting the cell reception time TT are supplied to the register 16 shown in FIG. 6.

The subtracting circuit 154 subtracts the cell transmission time ST, which is received from the register 16, from the cell reception time TT, which is also received from the register 16. An output of the subtracting circuit 154 is supplied to the register 155. An output of the register 155 is supplied to the subtracting circuit 159 on one hand, and is supplied to the register 156 through the buffer 157 on the other. However, the buffer 157 is enabled by an output of the comparator 158 only if the comparator 158 judges that the content of the register 156, which stores the minimum value, is greater than the content stored in the register 155. The content of the register 155 is subtracted from the content of the register 156 in a subtracting circuit 159. An output of the subtracting circuit 159 is supplied to an adding circuit 161, which receives the delay distortion suppressing range Fd from the delay distortion suppressing range setting circuit 160. For example, the delay distortion suppressing range setting circuit 160 may be a register, which receives the delay distortion suppressing range Fd from outside the judgement and read control part 15.

An output of the adding circuit 161 is supplied to the counter 162 as a load value, and this load value is loaded in response to the cell header pulse HP2, which is received from the FIFO memory 11. An output carry signal of the counter 162 is supplied to the counter 163 and the flip-flop 164. The counter 163 counts the number of data words within the cell in respect the output carry signal of the counter 162, and supplies a carry signal to the flip-flop 164. Hence, the flip-flop 164 is set and reset responsive to the output carry signals of the counters 162 and 163, and an output signal of the flip-flop 164 is supplied to the AND circuit 165 as a coded data read enable signal REN2. The AND circuit 165 receives the empty flag EP, the word clock signal WCLK and the coded data read enable signal REN. The AND circuit 165 and supplies an output signal to the OR circuit 152, which outputs the read clock signal RCK.

Figure 12:
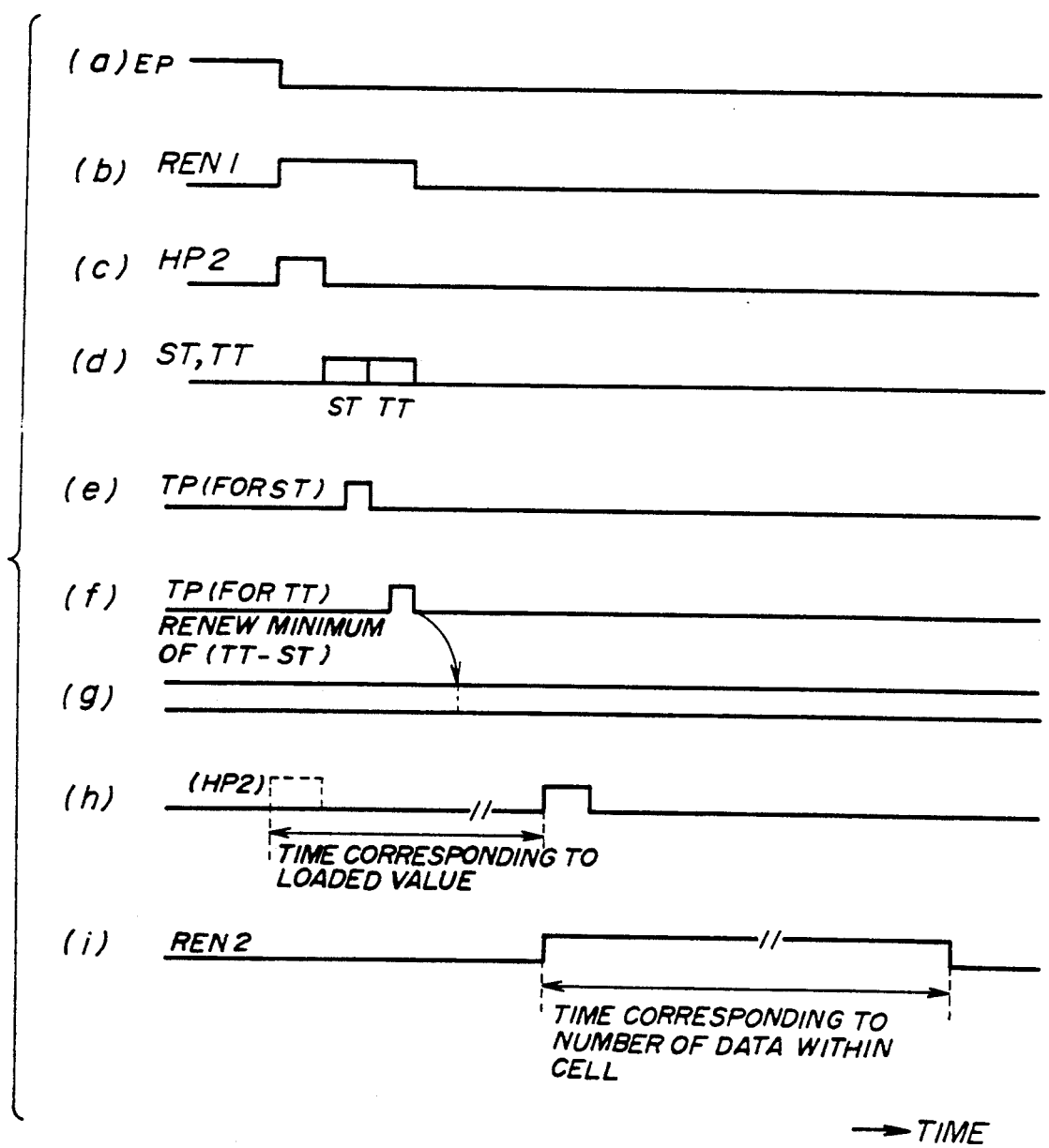
FIG. 12 is a timing chart for explaining the operation of the judgement and read control part shown in FIG. 11.

FIG. 12 is a timing chart showing signals at various parts of the judgement and read control part 15 shown in FIG. 11. In FIG. 12, (a) shows the empty flag EP from the FIFO memory 11, (b) shows the read enable signal REN1 from the HP2/ST/TT read enable signal generator 150, (c) shows the cell header pulse HP2 from the FIFO memory 11, and (d) shows the cell transmission time ST and the cell reception time TT from the FIFO memory 11. The timing pulse TP for setting the cell transmission time ST is shown in (e) of FIG. 12, and the timing pulse TP for setting the cell reception time TT is shown in (f) of FIG. 12. In FIG. 12, (g) shows the renewal timing of the minimum value (TT-ST), (h) shows the output carry signal of the counter 62, and (i) shows the coded data read enable signal REN2 from the flip-flop 164.

Figure 13:
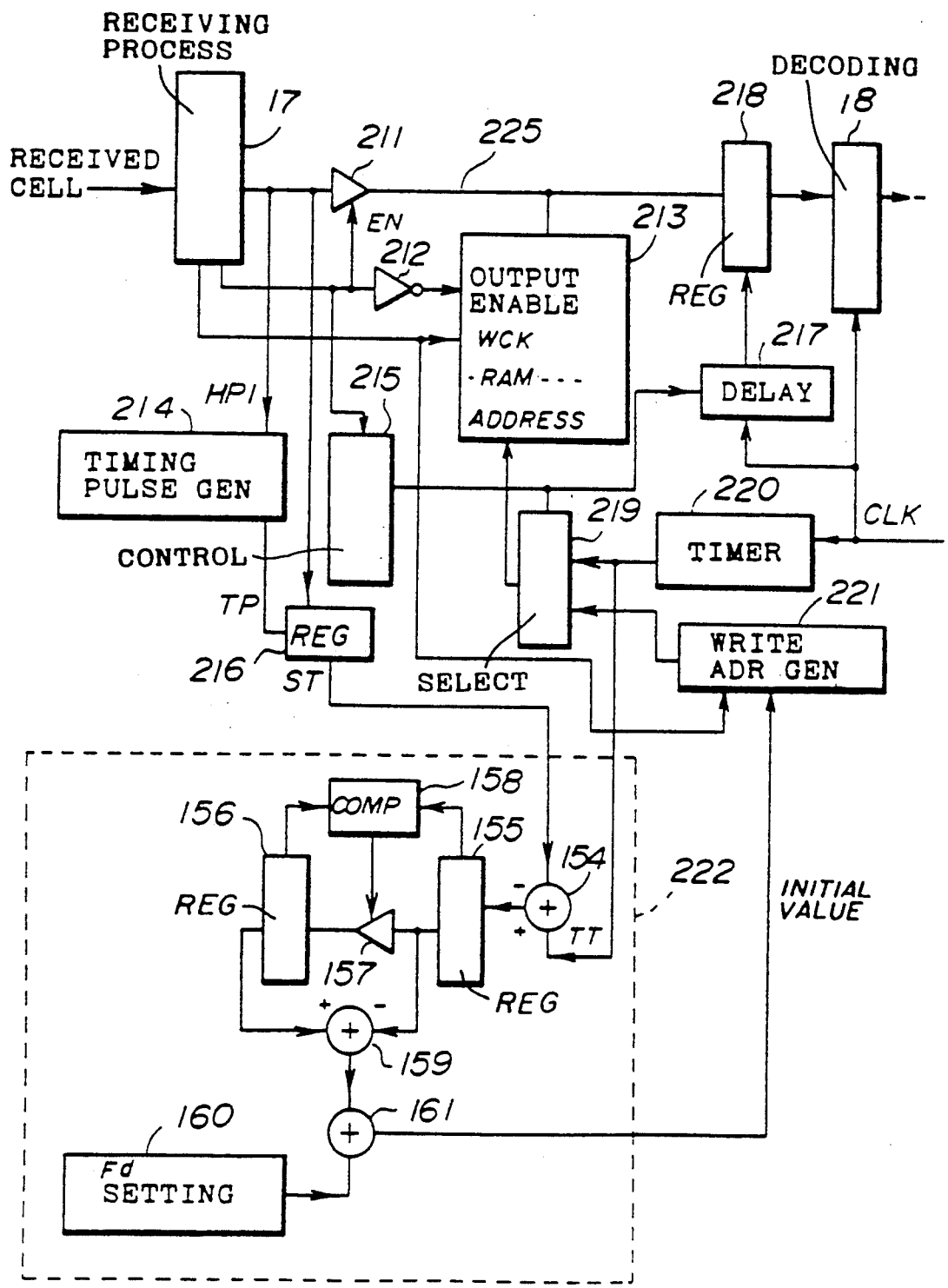
FIG. 13 is a system block diagram showing a modification of the second embodiment.

Next, a description will be given of a modification of the second embodiment, by referring to FIG. 13. In FIG. 13, those parts which are the same as those corresponding parts in FIGS. 6 and 11 are designated by the same reference numerals, and a description thereof will be omitted. In this embodiment, a random access memory (RAM) is used in place of the FIFO memory.

The system shown in FIG. 13 includes the receiving process part 17, a buffer 211, an inverter 212, a RAM 213, a timing pulse generator 214, a control part 215, registers 216 and 218, a delay circuit 217, a selector 219, a timer 220, a write address generator 221, and a circuit part 222. The circuit part 222 is identical to the corresponding circuit part shown in FIG. 11.

Figure 14:
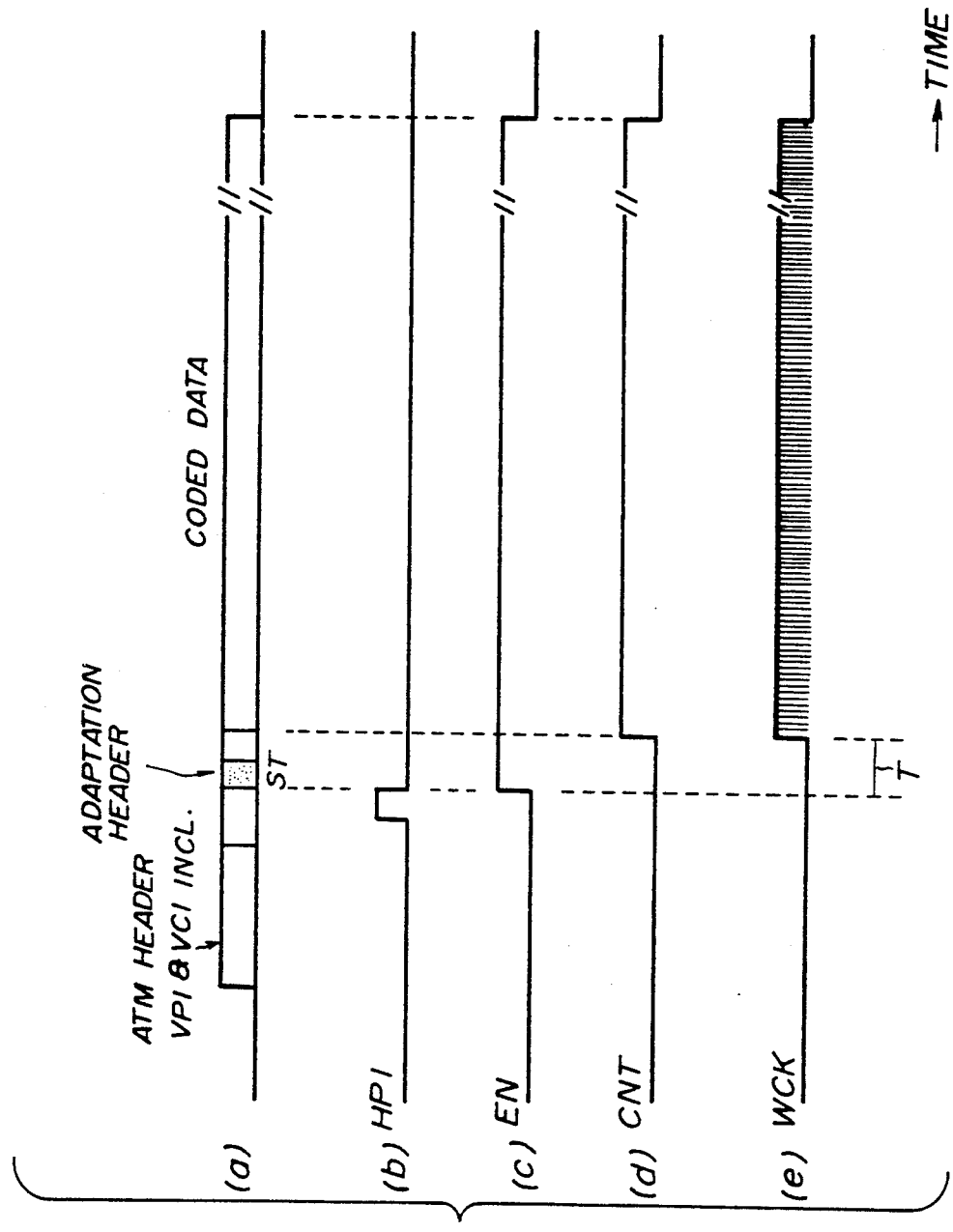
FIG. 14 is a timing chart for explaining the operation of the modification shown in FIG. 13.

In FIG. 13, the received cell shown in (a) of FIG. 14 is input to the receiving process part 17. The cell data is supplied to a bus 225 via the buffer 211. The cell header pulse HP1 from the receiving process part 17 is supplied to the timing pulse generator 214 which generates the timing pulse TP. The timing pulse TP causes the transmission time ST from the receiving process part 17 to be supplied to the register 216. The cell header pulse HP1 is shown in (b) of FIG. 14. The cell transmission time ST is set in the register 216 in response to the timing pulse TP from the timing pulse generator 214. The cell transmission time ST is supplied to the subtracting circuit 154 of the circuit part 222.

On the other hand, the enable signal EN from the receiving process part 17 is supplied to the buffer 211 and to the RAM 213 through the inverter 212. The enable signal EN is shown in (c) of FIG. 14. Hence, the cell data is supplied to the RAM 213 through the buffer 211 if the buffer is enabled by the enable signal EN. On the other hand, if the buffer 211 is disabled by the enable signal EN, then an output signal of the inverter 212 enables output from the RAM 213. In other words, the cell data can be written into the RAM 213 as long as the buffer 211 is enabled. The stored cell data can be read out from the RAM 213 as long as the buffer 211 is disabled. The RAM 213 also receives the write clock signal WCK from the receiving process part 17.

On the other hand, the enable signal EN is also supplied to the control part 215 which outputs a control signal CNT shown in (d) of FIG. 14. The control signal CNT is supplied to the delay circuit 217 and the selector 219. The selector 219 is switched to selectively output the read address during a low-level period of the control signal CNT and to selectively output the write address during a high-level period of the control signal CNT. The read or write address output from the selector 219 is supplied to the RAM 213.

The read address of the RAM 213 is supplied from the timer 220, which generates the read address based on the decoding clock signal CLK. On the other hand, the write address of the RAM 213 is supplied from the write address generator 221. An initial value of the write address generator 221 is supplied from the adding circuit 161. The write address generator 221 counts up based on the write clock signal WCK which is received from the receiving process part 17. In FIG. 14, (e) shows the write clock signal WCK, and the initial value of the write address is determined during a time T.

The decoding clock signal CLK is also supplied to the delay circuit 217. Hence, if the decoding clock signal CLK rises during the high-level period of the control signal CNT, then the supply of the rising edge of the decoding clock signal CLK to the register 218 is delayed by the delay circuit 217 until the read address is selectively supplied from the selector 219 and supplied to the RAM 213. As a result, the cell data read out from the RAM based on the read address is set in the register through the bus 225 in response to the decoding clock signal CLK, which is received from the delay circuit 217. The content of the register 218 is decoded by the decoding part 18 responsive to the decoding clock signal CLK.

Next, a description will be given of the operating principle of a third embodiment of the delay distortion suppressing system according to the present invention, by referring to FIG. 15.

Figure 15:
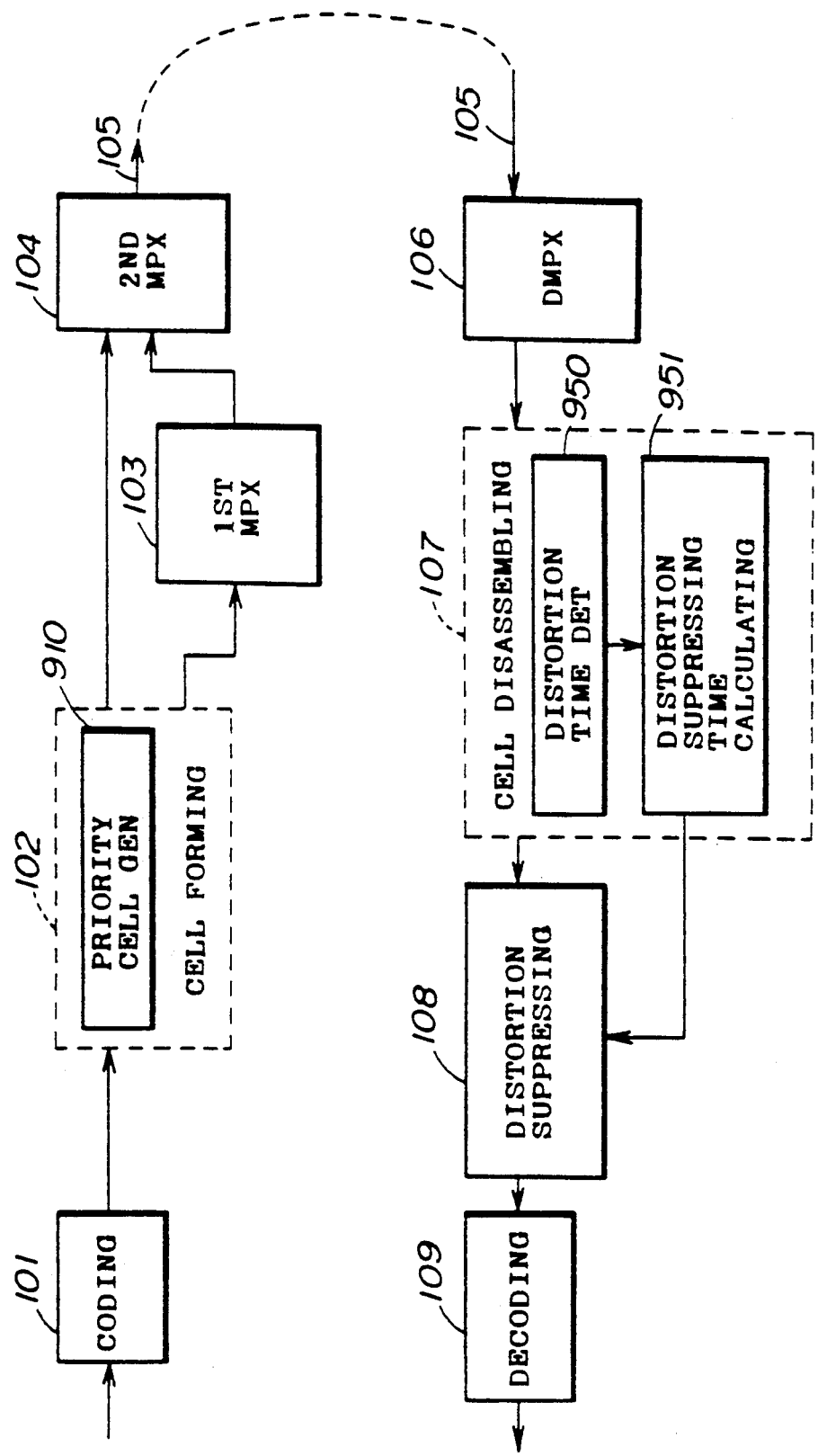
FIG. 15 is a system block diagram for explaining the operating principle of a third embodiment of the delay distortion suppressing system according to the present invention.

The system shown in FIG. 15 includes a coding part 101, a cell forming part 102 which includes a priority cell generating part 910, a first multiplexing part 103, a second multiplexing part 104, a transmission line 105, a demultiplexing part 106, a cell disassembling part 107, which includes a distortion time detecting part 950 and a distortion suppressing time calculating part 951, a distortion suppressing part 108, and a decoding part 109, which are connected as shown.

In this embodiment, the transmitting end regards a first cell of a signal such as an audio signal as a priority cell, and transmits this priority cell over a path which has a minimum cell delay. The cells which follow the first cell are transmitted over a normal path. At the receiving end, the delay times of the cells, which follow the priority cell are obtained based on the arrival times of the priority cell and the cells following the priority cell. A maximum delay time of the cells which follow the priority cell is obtained statistically, and the delay times of the cells which follow the priority cell are adjusted so as to become the maximum delay time, thereby suppressing the delay distortion.

At the transmitting end, an original signal such as an audio signal is digitized in the coding part 101 and cells are formed in the cell forming part 102. The first information of the original signal is input to the priority cell generating part 910 wherein a priority cell is generated. An identification code, which indicates the priority cell, is added within the information and supplied to the second multiplexing part 104. The priority cell does not pass through a buffer of the first multiplexing part 103, and is thus not subject to the cell disposal. Hence, the priority cell has a minimum cell delay, and is processed at the receiving end as having a minimum delay distortion, that is, a zero distortion time.

The cells which follow the priority cell are input to the first multiplexing part 103 from the cell forming part 102. At the first multiplexing part 103, the cells, are multiplexed with the normal cells which are received from cell forming parts 102, which correspond to other terminals, and the multiplexed cells from the first multiplexing part 103 are input to the second multiplexing part 104. The second multiplexing part 104 multiplexes the cells, which are received from a plurality of first multiplexing parts 103 and the priority cells, which are received from a plurality of cell forming parts 102. The multiplexed cells from the second multiplexing part are transmitted to a node (exchange) at the other end via the transmission line 105, which connects to the destination. In actual practice, the multiplexed cells are first subjected to a switching in units of cells in an ATM switch (not shown) before being transmitted to the transmission line 105.

At the node on the other end (receiving end), the multiplexed cells received over the transmission line 105 are input to the demultiplexing part 106. In actual practice, the multiplexed cells are subjected to a switching in the ATM switch before being input to the demultiplexing part 106. The multiplexed cells are demultiplexed into the cells, which correspond to each of the terminals. The demultiplexed cells are input to the cell disassembling part 107. When the cell disassembling part 107 detects the priority cell, the distortion time detecting part 950 measures the timing with reference to the arrival time of the priority cell. The arrival of the following cells is awaited and the cells are disassembled. The disassembled cells are supplied to the decoding part 109 through the distortion suppressing part 108.

Figure 16:
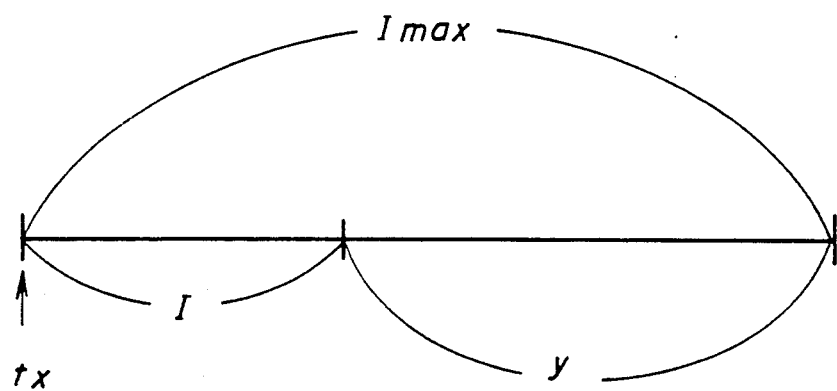
FIG. 16 is a diagram for explaining the delay distortion suppressing operation with reference to FIG. 15.

The delay distortion suppressing operation carried out at the receiving end will now be described with reference to FIG. 16. When the first one of the cells following the priority cell arrives at the receiving end, the distortion time detecting part 950 measures arrival time of this first cell with reference to the arrival time of the priority cell. The arrival times of the other following cells are measured similarly by the distortion time detecting part 950 so as to detect the delay time of each cell. The time intervals with which the normal cells, that is, the cells other than the priority cell, are generated, is known at the receiving end because the cell generation intervals at the transmitting end is known. Hence, the delay time of each cell can be calculated by determining the difference between the actual reception time of the cell and the predicted reception time of the cell with respect to the reception time of the priority cell. The distortion time I shown in FIG. 16 can be obtained for each cell by obtaining the delay time for each cell. The distortion times for a predetermined number of cells are measured, and a maximum distortion time $I_{max}$ shown in FIG. 16 is obtained from the measured distortion times. In FIG. 16, $t_x$ denotes the reception time of the priority cell.

When the maximum distortion time $I_{max}$ is obtained, the distortion time detecting part 950 of the cell disassembling part 107 supplies the distortion times I of each of the following cells to the distortion suppressing time calculating part 951. The distortion suppressing time calculating part 951 calculates the difference between the maximum distortion time $I_{max}$ and the distortion time of each cell, that is, calculates $I_{max} - I = y$ shown in FIG. 16 for each cell. The calculation result y for each cell is supplied to the distortion suppressing part 108 which delays each cell by the corresponding delay time y. As a result, each cell is delayed by the constant time $I_{max}$ in total, and the delay distortion is effectively suppressed.

It was described above that the cell forming part 102 at the transmitting end generates the priority cell from the priority cell generating part 910 only when the first information of the original signal is detected. However, the cell forming part 102 may be designed to generate the priority cell from the priority cell generating part 910 for every predetermined period of the original signal. In this case, the reference time can be obtained at the receiving end for every predetermined time. The maximum distortion time can be appropriately changed depending on the state of the communication path.

Figure 17A:
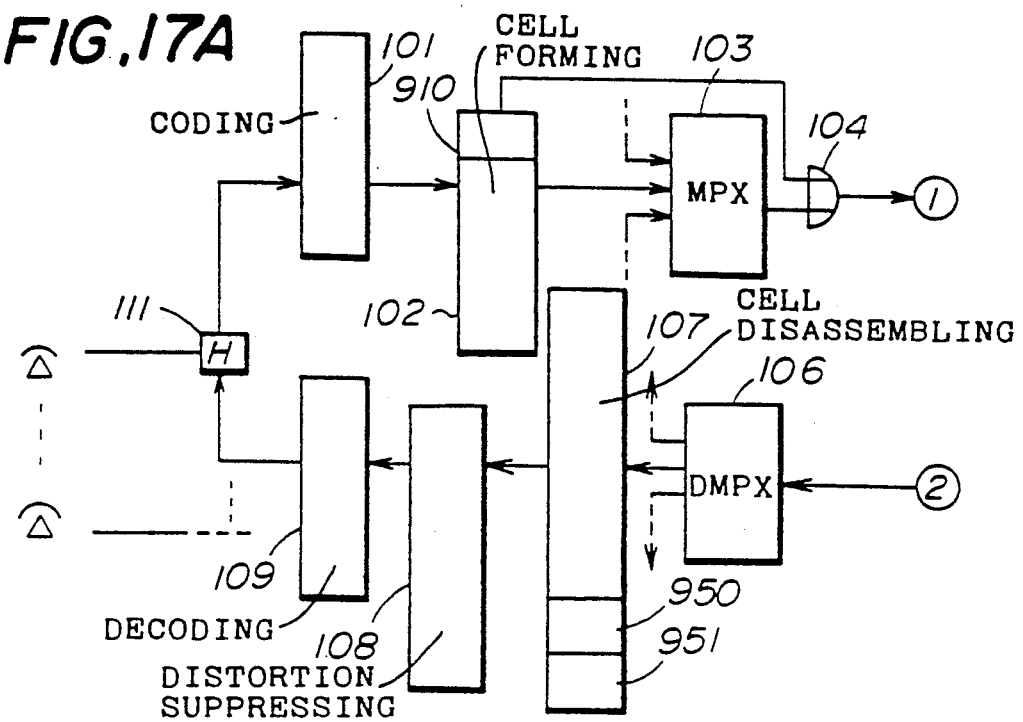
FIGS. 17A and 17B are system block diagrams showing the third embodiment.
Figure 17B:
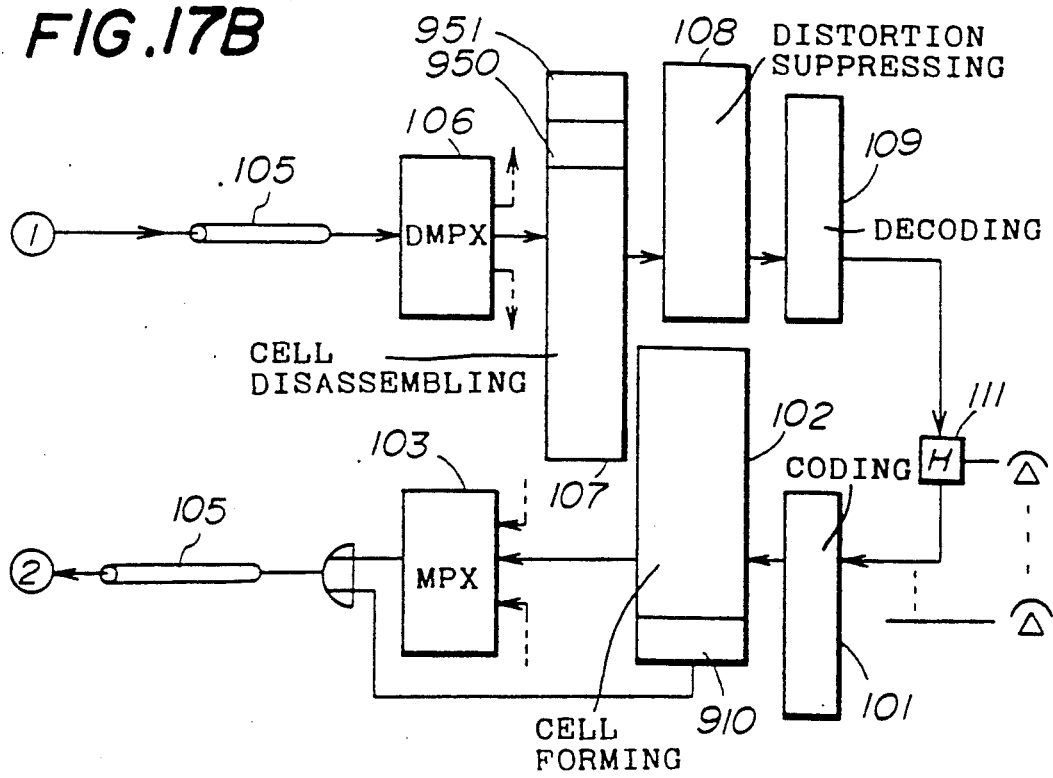
Figure 18:
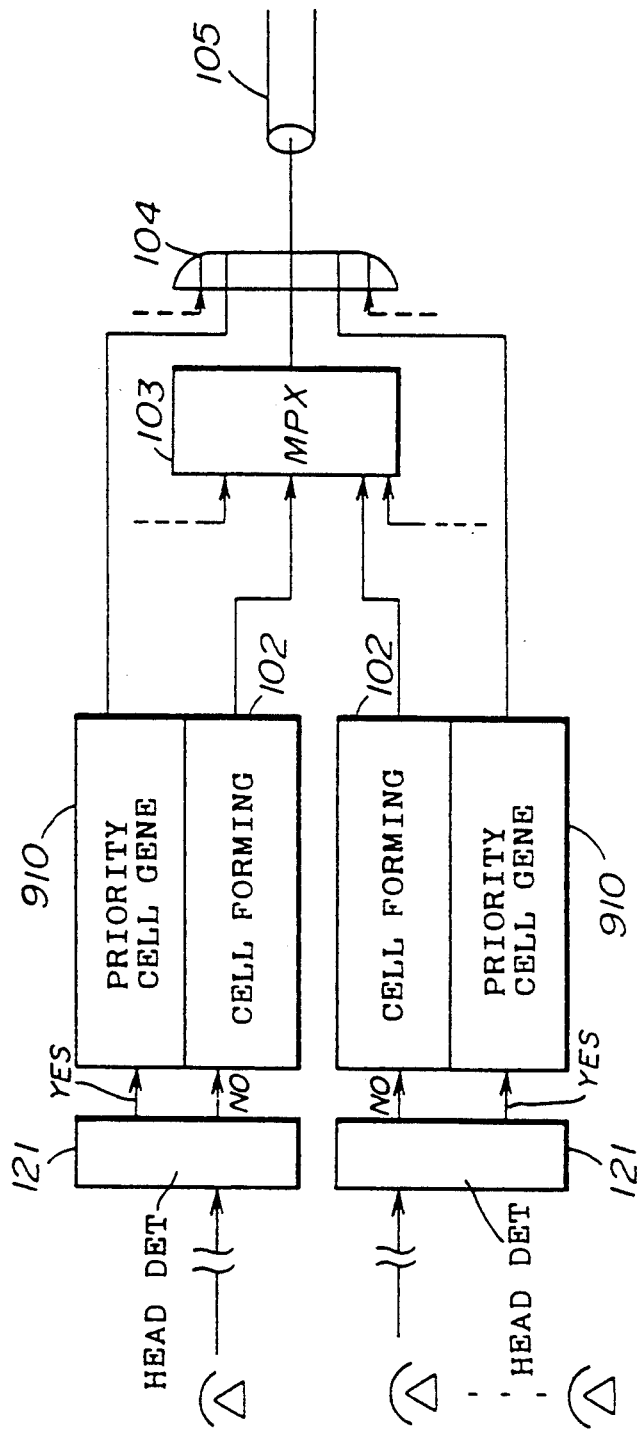
FIG. 18 is a system block diagram showing the vicinity of a multiplexing part shown in FIGS. 17A and 17B.
Figure 19:
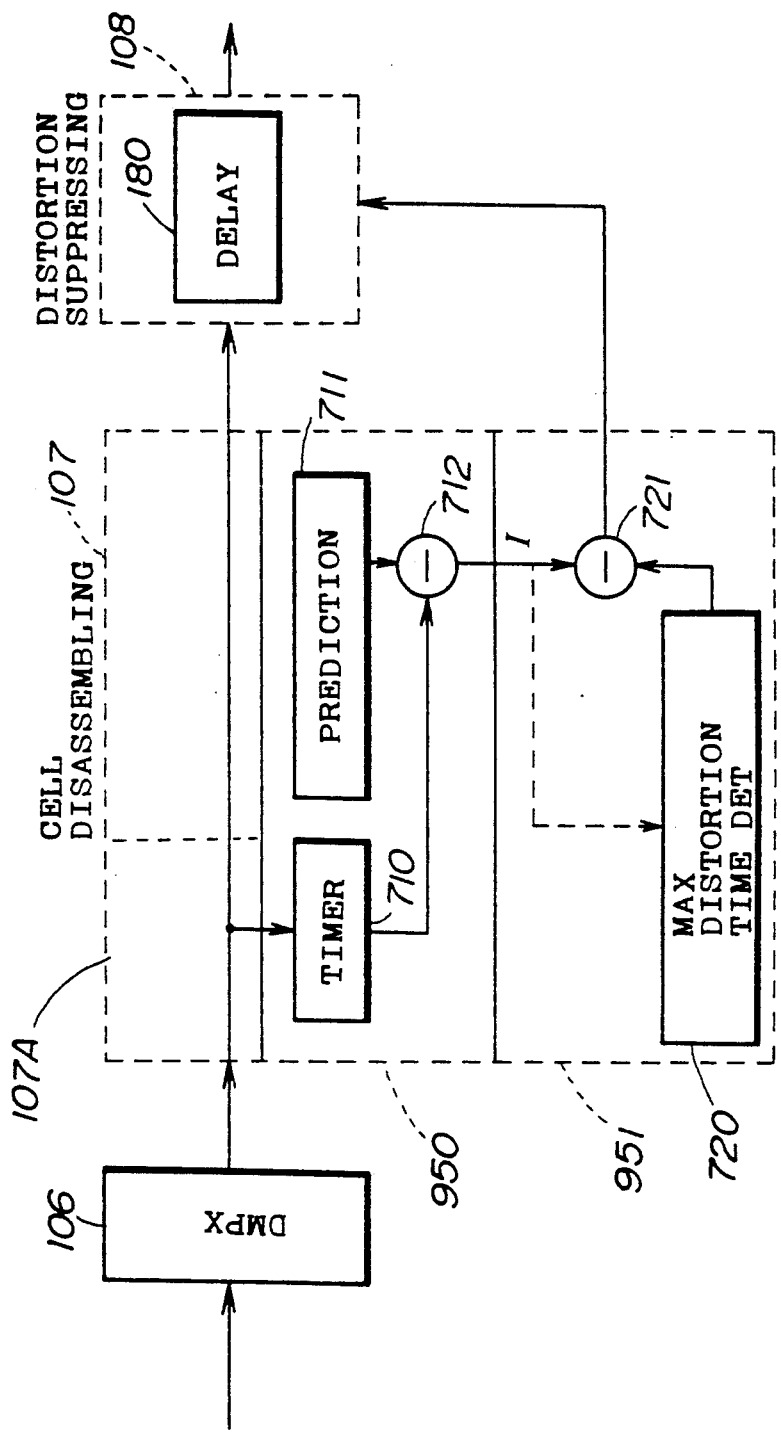
FIG. 19 is a system block diagram showing the vicinity of a demultiplexing part shown in FIGS. 17A and 17B.
Figure 20:
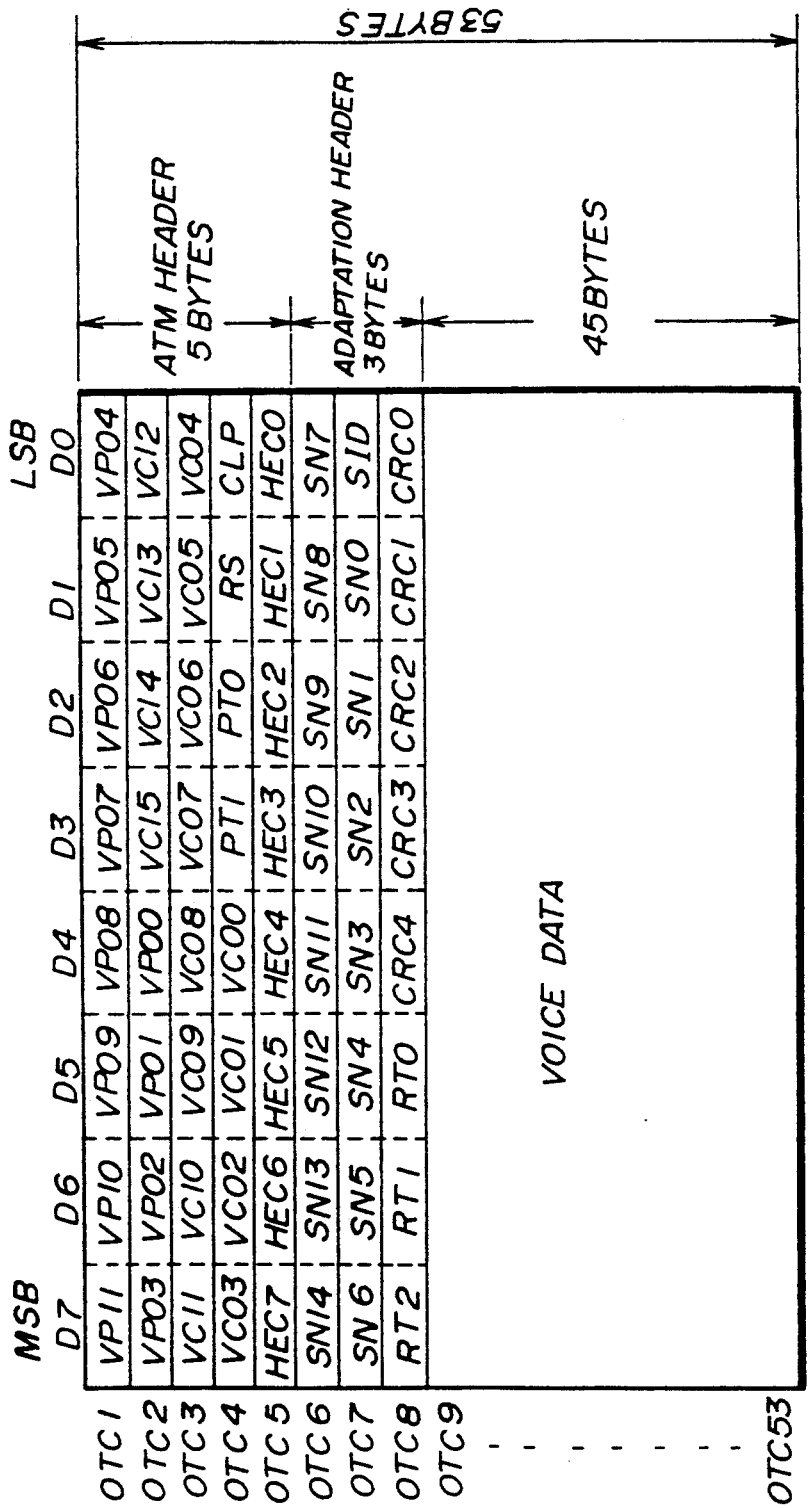
FIG. 20 is a diagram showing a cell format.

Next, a more detailed description of the third embodiment will be given with reference to FIGS. 17 through 20. FIGS. 17A and 17B show the third embodiment, FIG. 18 shows the construction in the vicinity of the multiplexing part 103 FIG. 19 shows the construction in the vicinity of the demultiplexing part 106 and FIG. 20 shows the cell format. In FIGS. 17A, 17B, 18 and 19, those parts, which are the same as those corresponding parts in FIG. 15, are designated by the same reference numerals, and a description thereof will be omitted.

FIGS. 17A and 17B shows the structure provided between two terminals, which are connected to two exchanges (switching systems). In FIGS. 17A and 17B, the second multiplexing part 104 is shown as an OR (logical sum) circuit. However, a control circuit (not shown) is actually provided to control the OR circuit so that the plurality of signals input to the OR circuit do not overlap when obtaining the logical sum of the signals. A hybrid circuit 111 switches the subscriber line which connect to each terminal between the transmitting side and the receiving side of the ATM switch.

FIG. 18 shows the vicinity of the multiplexing part 103 shown in FIG. 17A. In FIG. 18, the original signal, such as the audio signal, which is transmitted from the terminal, is supplied to the cell forming part 102 through the coding part 101 shown in FIG. 17A. The cell forming part 102 includes a head detector 121, which detects the head of the audio signal or the like. When the head detector 121 detects the head, the priority cell generating part 910 is started in response to an output of the head detector 121. The priority cell generating part 910 adds a specific indication to the head (first) cell, which corresponds to the head of a series of continuous voice information, and supplies this cell as the priority cell to the second multiplexing part 104 directly, i.e., not through the first multiplexing part 103. The series of continuous voice information is divided into a plurality of cells. The second multiplexing part 104 multiplexes the priority cell from the priority cell generating part 910 with the other cells. Which are received from the first multiplexing part 103. The multiplexed cells are output from the second multiplexing part 104 and transmitted to the transmission line 105 through a switching part (not shown).

As shown in FIG. 20, each cell is made up of 53 bytes. The first 5 bytes of the cell form an ATM header in which various prescribed information such as VPI, VCI and HEC are set. The 48 bytes following the 5-byte ATM header form the information field, and a 3-byte adaptation header is provided in the first 3 bytes of the information field. The 3-byte adaptation header includes a 15-bit segment number SN, a 1-bit segment identifier SID, a 3-bit rate code RT, and a 5-bit cyclic redundancy check code CRC. The segment number SN indicates the position (number) of the cell. The original information is divided into a plurality of cells based on the SN. The segment identifier SID indicates the identification information of the segment. In this embodiment, the specific indicator for indicating the priority cell is inserted in one bit of the adaptation header. For example, one bit within the 15-bit segment number SN is used as the specific indicator bit. The priority cell is indicated if the specific indicator bit is "1". The cells following the priority cell are indicated if the specific indicator bit is "0".

Figure 21:
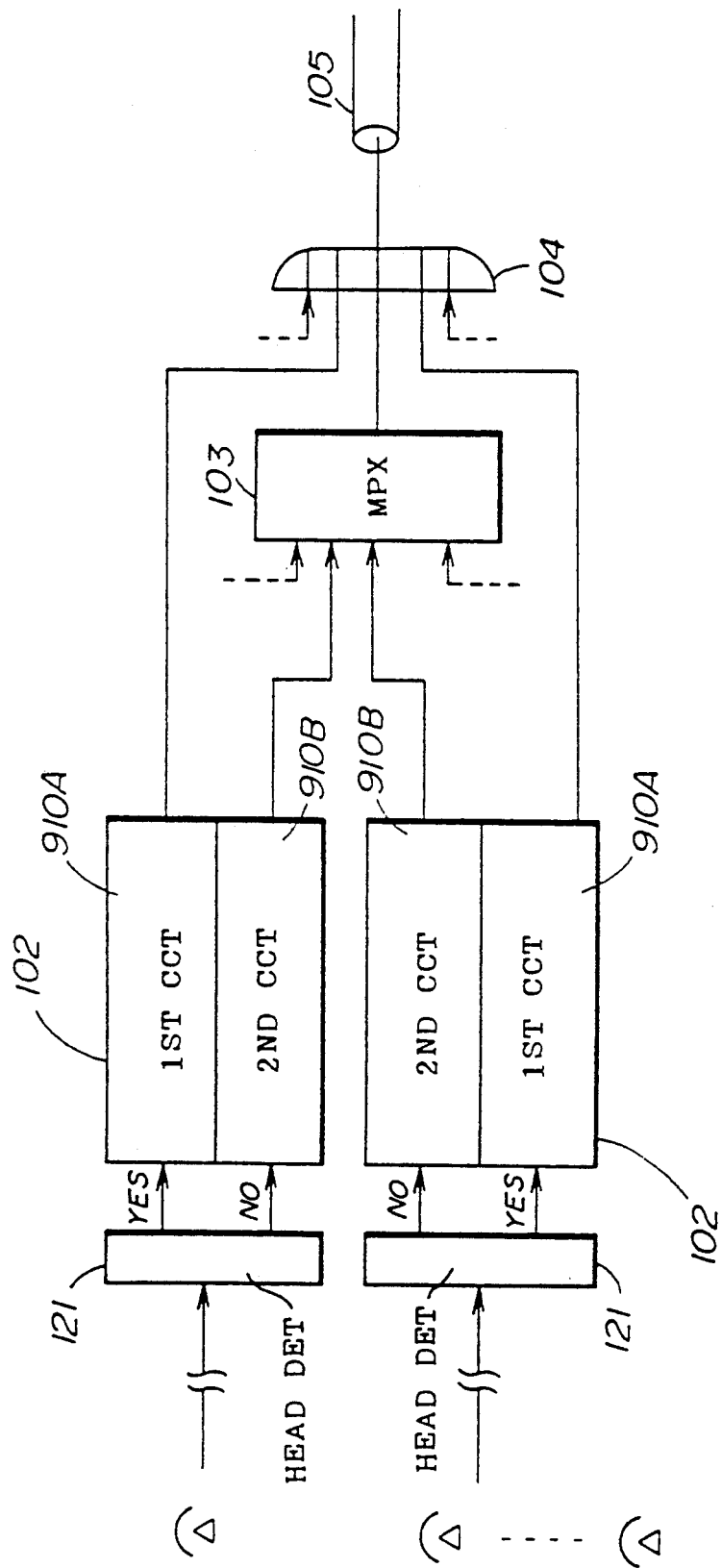
FIG. 21 is a system block diagram showing an embodiment of a cell forming part.

FIG. 21 shows an embodiment of the cell forming part 102. In FIG. 21, the priority cell generating part 910 includes a first circuit part 910A for setting the specific indicator bit to "1" in the adaptation header of the cell in response to the output of the head detector 121 if the head detector 121 detects the head of the original signal; and a second circuit part 910B for resetting the specific indicator bit to "0" in the adaptation header of the cell in response to the output of the head detector 121 if the head detector 121 detects no head of the original signal. The priority cell output from the first circuit part 910A is supplied to the second multiplexing part 104, while the normal cell output from the second circuit part 910B is supplied to the first multiplexing part 103.

FIG. 19 shows the vicinity of the demultiplexing part 106 shown in FIG. 17B. In FIG. 19, the multiplexed cells, which are received from the transmission line 105 through the switching part (not shown), is input to the demultiplexing part 106, wherein the multiplexed cells are demultiplexed into cells by destination. Each demultiplexed cell is supplied to the corresponding cell disassembling part 107 by destination. The cell disassembling part 107 has the distortion time detecting part 950 and the suppressing time calculating part 951 in addition to a mechanism for disassembling the cells.

If the cell disassembling part 107 shown in FIG. 19 detects the arrival of the priority cell, a timer 710 of the time detecting part 950 is started. The cell disassembling part 107 detects the arrival of the priority cell by a detecting circuit 107A, which detects whether or not the specific indicator bit within the adaptation header of the received cell has the value "1". If the cell following the priority cell arrives, the measured value T of the timer 710 is input to a subtracting circuit 712. The subtracting circuit 712 also receives a time value t from a prediction circuit 711. This time value t describes a predicted cell interval depending on the kind of original signal. As a result, the subtracting circuit 712 calculates $T-t=I$, and supplies the result I to the distortion suppressing time calculating part 951. The timer 710 of the suppressing time detecting part 950 is reset to start a new timer operation immediately after the timer 710 supplies the measured value T to the subtracting circuit 712 in response to the arrival of the cell. Hence, the suppressing time I is successively supplied to the distortion suppressing time calculating part 951.

A maximum distortion time detector 720 of the distortion suppressing time calculating part 951 detects and holds a maximum suppressing time $I_{max}$ out of a predetermined number of suppressing times I, which are received from the suppressing time detecting part 950. Thereafter, the suppressing time detecting part 951 is started to calculate $I_{max}-I=y$ with respect to the suppressing time I, which is received from the suppressing time detecting part 950. In other words, a subtracting circuit 721 subtracts the suppressing time I received from the suppressing time detecting part 950 from the maximum suppressing time $I_{max}$ received from the maximum suppressing time detector 720. The result y output from the subtracting circuit 721 is supplied to the distortion suppressing part 108. The distortion suppressing part 108 delays the disassembled cell (that is, only the data of the information field) in a delay circuit 180 in response to the output signal of the distortion suppressing time calculating part 951 indicating the calculated result y. The output data of the distortion suppressing part 108 is supplied to the decoding part 109, which decodes the cell delayed by a predetermined delay time and therefore eliminates the delay distortion. The decoded data output from the decoding part 109 is transmitted to the terminal via the hybrid circuit 111.

Further, the present invention is not limited to these embodiments, but various variations and modifications may be made without departing from the scope of the present invention.

What is claimed is:

1. A delay distortion suppressing system for an asynchronous transfer mode communication system, having a transmission path carrying cells having a header and an information field, comprising:
   a transmitting end;
   first means, provided in the transmitting end, for transmitting information over the transmission path in the form of cells in the asynchronous transfer mode, and for inserting a cell transmission time in the header of each cell;
   second means for delaying each cell transmitted over the transmission path to, and received by, receiving means by a predetermined delay time relative to a selectively variable reference point, wherein
   the second means further comprises:
      storage means for storing each cell transmitted over the transmission path,
      inserting means for inserting a cell reception time in the header of each cell transmitted over the transmission path,
      control means for controlling write and read operations of the storage means based on the cell transmission time and the cell reception time stored in the header of each cell which is read out from the storage means, and
      the control means for controlling a delay distortion suppressing range and the predetermined delay time so that the cell, which arrives first, is written into the storage means and read out after a time which corresponds to the delay distortion suppressing range;
   third means, coupled to the second means, for varying the reference point depending on the cell reception time of the received cell, so that delay distortion of the cells is suppressed, wherein the third means varies the reference point if a difference between the cell transmission time and the cell reception time is smaller than the predetermined delay time; and fourth means coupled to the second means, for decoding the cells output from the second means, 2. The delay distortion suppressing system as claimed in claim 1, wherein the predetermined delay time is a minimum delay time of the cell.

3. The delay distortion suppressing system as claimed in claim 1, wherein:

the second means further comprises timer means for counting a decoding clock signal which is supplied to the decoding means; and the inserting means inserts a counted value of the timer means as the cell reception time.

4. The delay distortion suppressing system as claimed in claim 1, wherein the control means controls the storage means so that the decoding means receives only the information field of each cell read out from the storage means.

5. The delay distortion suppressing system as claimed in claim 1, wherein the storage means comprises a first-in-first-out memory.

6. The delay distortion suppressing system as claimed in claim 1, wherein the storage means comprises a random access memory.

7. The delay distortion suppressing system as claimed in claim 1, wherein the control means controls the storage means to read out the header of the cell from the storage means every time a decoding operation of the fourth means ends, and wherein the control means controls the storage means to read out the information field of the cell from the storage means to be supplied to the fourth means if the third means changes the reference point.

8. A delay distortion suppressing system for an asynchronous transfer mode communication system, having a transmission path, comprising:

a transmitting end;

first means, provided in the transmitting end, for transmitting information over the transmission path in the form of cells in the asynchronous transfer mode, and for generating a priority cell, the priority cell being transmitted over a transmission path which causes a minimum delay while other cells following the priority cell are transmitted over other transmission paths having normal delays;

second means for delaying each cell transmitted over the transmission path to, and received by, receiving means by a predetermined delay time relative to a selectively variable reference point, and for delaying each cell by the predetermined delay time which is set independently for each cell so that a total delay time of each cell becomes the maximum delay time;

third means, coupled to the second means, for varying the reference point depending on the cell reception time of the received cell, so that delay distortion of the cells is suppressed, and for setting a reception time of the priority cell as the reference point and means for statistically obtaining a maximum delay time of the cells following the priority cell; and fourth means coupled to the second means, for decoding the cells output from the second means.

9. The delay distortion suppressing system as claimed in claim 8, wherein each cell comprises:

a header for storing a cell transmission time and a cell reception time for each cell;

an information field having an adaptation header; and indicator, which is inserted in the adaptation header of the cell by the priority cell generating means, to indicate that the cell is the priority cell.

10. The delay distortion suppressing system as claimed in claim 9, wherein the adaptation header further comprises:

a segment number, a segment identifier, a rate code and a cyclic redundancy check code, and a specific indicator bit.

11. The delay distortion suppressing system as claimed in claim 8, wherein the priority cell generating means transmits the priority cell with a predetermined period.

12. A method of asynchronous transfer mode communication comprising:

inserting a cell transmission time in the header of each cell before transmitting each cell;

transmitting information in the form of cells over a transmission path, each cell having a header and an information field;

receiving each transmitted cell from the transmission path;

determining a cell reception time for each received cell;

inserting the cell reception time in the header of each cell received from the transmission path;

storing each cell received from the transmission path in a memory device;

determining the difference between the cell transmission time and the cell reception time;

controlling write and read operations of the memory device based on the cell transmission time and the cell reception time stored in the header of each cell, which is read out from the memory device;

delaying the reading of each cell according to a delay distortion suppressing range and predetermined delay time based upon a reference point, so that each cell, which arrives first, is written into the memory device and read out from the memory device after a time, which corresponds to the delay distortion suppressing range;

varying the reference point upon determining that a difference between the cell transmission time and the cell reception time is smaller than the predetermined delay time; and decoding the information field of each delayed cell.

13. The method for asynchronous transfer mode communication as claimed in claim 12, further comprising:

counting a decoding clock signal, which is supplied to a decoder; and inserting the counted value as the cell reception time.

14. The method for asynchronous transfer mode communication as claimed in claim 12, further comprising reading only the information field of each cell from the memory device to the decoder.

15. The method for asynchronous transfer mode communication as claimed in claim 12, further comprising:

controlling the readout of the header of each cell each time the decoding of the information of each cell ends; and controlling the readout of the information field of each cell from the memory device to the decoding device if the reference point changes.

16. A method for asynchronous transfer mode communication as claimed in claim 12, comprising:
generating a priority cell having a header and an information field having an adaption header, which is transmitted by way of a transmission path, which causes a minimum delay;
transmitting other cells following the priority cell by way of other transmission paths having normal delays;
setting the arrival time of the priority cell at the reference point;
setting a maximum delay time of the cells following the priority cell; and
delaying each cell by the predetermined delay time, which is set independently for each cell so that a total delay upon each cell becomes the maximum delay time.

17. The method for asynchronous transfer mode communication as claimed in claim 16, further comprising inserting a specific indicator in the adaption header of each cell to indicate whether the cell is the priority cell.

18. The method for asynchronous transfer mode communication as claimed in claim 16, further comprising transmitting the priority cell with a predetermined cell period.

19. The method for asynchronous transfer mode communication as claimed in claim 16, further comprising:
multiplexing each cell before transmission through the transmission path; and
demultiplexing each multiplexed cell received from the transmission path.

20. The method for asynchronous transfer mode communication as claimed in claim 12, further comprising:
multiplexing each cell before transmission through the transmission path; and
demultiplexing each multiplexed cell received from the transmission path.

21. A delay distortion suppressing system for an asynchronous transfer mode communication system which transfers information over a transmission path comprising:
transmitting means, connected to the transmission path, for transmitting the information over the transmission path in a cell in the asynchronous transfer mode, and for inserting a transmission time in the header of the cell, wherein the cell comprises a header and an information field;
receiving means, connected to the transmission path, for receiving the cell from the transmission path comprising:
storage means for storing each cell transmitted over the transmission path,
inserting means for inserting the cell reception time in the header of the cell transmitted over the transmission path,
control means for controlling write and read operations of the storage means based on the cell transmission time and the cell reception time stored in the header of the cell which is read out from the storage means,
the control means for controlling a delay distortion suppressing range and the predetermined delay time;
delay means for delaying the received cell by a predetermined delay, which depends upon a selectively variable reference point, which varies based on a time in which the cell is received, so that a delayed distortion of the cell is suppressed, and for varying the reference point if a difference between the cell transmission time and the cell reception time is smaller than the predetermined delay time, and
decoding means, coupled to the delay means, for decoding the delayed cells.

22. The delay distortion suppressing system as claimed in claim 2, wherein:
the transmitting means further comprises a priority cell generating means for generating a priority cell, the priority cell being transmitted over a transmission path, which causes a minimum delay while additional cells following the priority cell are transmitted over other transmission paths having normal delays;
the delay means further comprises means for setting a reception time of the priority cell as the reference point, means for statistically obtaining a maximum delay time of the cells following the priority cell and means for delaying each cell by the predetermined delay time, which is set independently for each cell, so that a total delay time of each cell becomes a maximum delay time.

23. The delay distortion suppressing system as claimed in claim 22, wherein each cell comprises:
a header for storing a cell transmission time and a cell reception time for each cell;
an information field having an adaption header; and
the priority cell generating means inserting a specific indicator in the adaption header of the cell to indicate that the cell is the priority cell.

24. The delay distortion suppressing system as claimed in claim 23, wherein the adaption header of the cell further comprises:
a segment number indicating the position of the cell among a plurality of cells carrying information in the asynchronous transfer mode;
a segment identifier indicating the identification information of the segment of each cell;
a rate code in the cyclic redundancy check code indicating the rate code and the cyclic redundancy check code for each cell; and
a specific indicator bit indicating whether the cell is the priority cell.

25. A delay distortion suppressing system for an asynchronous transfer mode communication system, having a transmission path carrying cells having a header and an information field, comprising:
a transmitting end;
a receiving end connected to the transmitting end;
first means, provided in the transmitting end, for transmitting information over the transmission path in the form of cells in the asynchronous transfer mode, and for inserting a cell transmission time in the header of each cell;
second means, provided in the receiving end, for delaying each cell transmitted over the transmission path to, and received by, receiving means by a predetermined delay time relative to a selectively variable reference point, wherein
the second means further comprises:
storage means for storing each cell transmitted over the transmission path, inserting means for inserting the cell reception time in the header of the cell transmitted over the transmission path, control means for controlling write and read operations of the storage means based on the cell transmission time and the cell reception time stored in the header of the cell which is read out from the storage means, and the control means for controlling a delay distortion suppressing range and the predetermined delay time so that the cell, which arrives first, is written into the storage means and read out after a time which corresponds to the delay distortion suppressing range;

third means, providing in the receiving end and coupled to the second means, for varying the reference point depending on the cell reception time of the received cell, so that delay distortion of the cell is suppressed, wherein the third means varies the reference point if a difference between the cell transmission time and the cell reception time is smaller than the predetermined delay time; and fourth means coupled to the second means, for decoding the cells output from the second means.

26. The delay distortion suppressing system as claimed in claim 25, wherein the predetermined delay time is a minimum delay time of the cell which is received at the receiving end.

27. The delay distortion suppressing system as claimed in claim 25, wherein:

the second means further comprises timer means for counting a decoding clock signal which is supplied to the decoding means; and the inserting means inserts a counted value of the timer means as the cell reception time.

28. The delay distortion suppressing system as claimed in claim 25, wherein the control means controls the storage means so that the decoding means receives only the information field of each cell read out from the storage means.

29. The delay distortion suppressing system as claimed in claim 25, wherein the storage means comprises a first-in-first-out memory.

30. The delay distortion suppressing system as claimed in claim 25, wherein the storage means comprises a random access memory.

31. The delay distortion suppressing system as claimed in claim 25, wherein the control means controls the storage means to read out the header of the cell from the storage means every time a decoding operation of the fourth means ends, and wherein the control means controls the storage means to read out the information field of the cell from the storage means to be supplied to the fourth means if the third means changes the reference point.

32. A delay distortion suppressing system for an asynchronous transfer mode communication system, having a transmission path, comprising:

a transmitting end;

a receiving end connected to the transmitting end;

first means, provided in the transmitting end, for transmitting information over the transmission path in the form of cells in the asynchronous transfer mode, and for generating a priority cell, the priority cell being transmitted over a transmission path which causes a minimum delay while other cells following the priority cell are transmitted over other transmission paths having normal delays;

second means, provided in the receiving end, for delaying each cell transmitted over the transmission path to, and received by, receiving means by a predetermined delay time relative to a selectively variable reference point, and for delaying each cell by the predetermined delay time which is set independently for each cell so that a total delay time of each cell becomes the maximum delay time;

third means, provided in the receiving end and coupled to the second means, for varying the reference point depending on the cell reception time of the received cell, so that delay distortion of the cell is suppressed, and for setting a reception time of the priority cell as the reference point and means for statistically obtaining a maximum delay time of the cells following the priority cell; and fourth means, coupled to the second means, for decoding the cells output from the second means.

33. The delay distortion suppressing system as claimed in claim 32, wherein each cell comprises:

a header for storing a cell transmission time and a cell reception time for each cell;

an information field having an adaption header; and a specific indicator, which is inserted in the adaptation header of the cell by the priority cell generating means, to indicate that the cell is the priority cell.

34. The delay distortion suppressing system as claimed in claim 33, wherein the adaptation header further comprises:

a segment number, a segment identifier, a rate code and a cyclic redundancy check code, and a specific indicator bit.

35. The delay distortion suppressing system as claimed in claim 32, wherein the priority cell generating means transmits the priority cell with a predetermined period.

* * * * *

UNITED STATES PATENT AND TRADEMARK OFFICE
CERTIFICATE OF CORRECTION

PATENT NO. : 5,301,193
DATED : April 5, 1994
INVENTOR(S) : Hidetoshi TOYOFUKU et al.

It is certified that error appears in the above-indentified patent and that said Letters Patent is hereby corrected as shown below:

<u>TITLE PAGE</u>

[57] Abstract, Line 1, delete "is".

Column 6, line 27, after "out" insert --from--.

Column 10, line 3, after "C1" insert --,--.

Column 13, line 56, after "causes the" insert --cell--.

Signed and Sealed this

Thirteenth Day of September, 1994

*Attest:*

BRUCE LEHMAN

*Attesting Officer*         *Commissioner of Patents and Trademarks*